United States Patent
Hao et al.

(10) Patent No.: US 11,671,158 B2
(45) Date of Patent: Jun. 6, 2023

(54) DETERMINING BEAM FAILURE BASED ON A DYNAMIC RANGE OF TRANSMISSION POWER RATIOS

(71) Applicant: Qualcomm Incorporated, San Diego, CA (US)

(72) Inventors: Chenxi Hao, Beijing (CN); Alexandros Manolakos, Escondido, CA (US); Tao Luo, San Diego, CA (US); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/764,990

(22) PCT Filed: Oct. 25, 2018

(86) PCT No.: PCT/CN2018/111978
§ 371 (c)(1),
(2) Date: May 18, 2020

(87) PCT Pub. No.: WO2019/095963
PCT Pub. Date: May 23, 2019

(65) Prior Publication Data
US 2020/0328795 A1    Oct. 15, 2020

(30) Foreign Application Priority Data
Nov. 17, 2017    (WO) ................ PCT/CN2017/111701

(51) Int. Cl.
*H04B 7/06*    (2006.01)
*H04L 1/20*    (2006.01)
(Continued)

(52) U.S. Cl.
CPC ......... *H04B 7/0695* (2013.01); *H04B 7/0626* (2013.01); *H04L 1/203* (2013.01);
(Continued)

(58) Field of Classification Search
None
See application file for complete search history.

(56) References Cited

U.S. PATENT DOCUMENTS

| 9,313,744 B2 | 4/2016 | Damnjanovic et al. |
| 2007/0105576 A1* | 5/2007 | Gupta ................ H04W 72/08 455/39 |

(Continued)

FOREIGN PATENT DOCUMENTS

| CN | 104349491 A | 2/2015 |
| CN | 105308889 A | 2/2016 |

(Continued)

OTHER PUBLICATIONS

International Search Report and Written Opinion—PCT/CN2017/111701—ISA/EPO—dated Jun. 28, 2018.
(Continued)

*Primary Examiner* — Yemane Mesfin
*Assistant Examiner* — Jeff Banthrongsack
(74) *Attorney, Agent, or Firm* — Qualcomm Incorporated

(57) ABSTRACT

Methods, systems, and devices for wireless communication are described that support beam failure determination based on a dynamic range of transmission power ratios between two reference signals (e.g., between a channel state information reference signal (CSI-RS) and a demodulation reference signal (DMRS) of a physical downlink control channel (PDCCH)). A wireless device may identify the dynamic range of transmission power ratios that may be used by a base station (e.g., via indications of maximum and minimum transmission power ratios, indications of one or more offsets from some average transmission power ratio, etc. sent from the base station). The wireless device may use the identified dynamic range of transmission power ratios, along with a CSI-RS measurement, to determine a range of hypothetical block error rates (BLERs). Values within the range of (Continued)

hypothetical BLERs may be compared to a threshold in order to determine a beam failure status (e.g., a beam failure).

62 Claims, 16 Drawing Sheets

(51) Int. Cl.
  *H04L 5/00* (2006.01)
  *H04W 16/28* (2009.01)
  *H04W 52/16* (2009.01)
  *H04W 52/36* (2009.01)
  *H04W 80/02* (2009.01)
  *H04W 76/27* (2018.01)
  *H04L 5/10* (2006.01)
  *H04W 52/42* (2009.01)
  *H04W 72/23* (2023.01)

(52) U.S. Cl.
  CPC .............. *H04L 5/0051* (2013.01); *H04L 5/10* (2013.01); *H04W 16/28* (2013.01); *H04W 52/16* (2013.01); *H04W 52/367* (2013.01); *H04W 52/42* (2013.01); *H04W 72/23* (2023.01); *H04W 76/27* (2018.02); *H04W 80/02* (2013.01)

(56) References Cited

U.S. PATENT DOCUMENTS

| | | | | |
|---|---|---|---|---|
| 2012/0028673 | A1* | 2/2012 | Jeong | H04W 52/244 455/522 |
| 2014/0177532 | A1 | 6/2014 | Kim et al. | |
| 2016/0014785 | A1 | 1/2016 | Benjebbour et al. | |
| 2016/0353510 | A1 | 12/2016 | Zhang et al. | |
| 2017/0019864 | A1 | 1/2017 | Hwang et al. | |
| 2019/0052339 | A1* | 2/2019 | Zhou | H04W 76/19 |
| 2019/0052380 | A1* | 2/2019 | Cui | H04B 17/318 |

FOREIGN PATENT DOCUMENTS

| | | |
|---|---|---|
| CN | 107079459 A | 8/2017 |
| CN | 107342801 A | 11/2017 |
| JP | 2016521085 A | 7/2016 |
| WO | WO-2013063548 A2 | 5/2013 |
| WO | WO-2017135803 A1 | 8/2017 |

OTHER PUBLICATIONS

International Search Report and Written Opinion—PCT/CN2018/111978—ISA/EPO—dated Jan. 17, 2019.
National Instruments: "Views on Beam Recovery Mechanism", 3GPP TSG RAN WGl Meeting 90bis, R1-1718457, Oct. 13, 2017 (Oct. 13, 207), pp. 1-3.
OPPO: "Discussion on Beam Recovery Mechanism", 3GPP TSG RAN WG1 Meeting 90bis, R1-1718055; Oct. 13, 2017 (Oct. 13, 2017), 6 Pages.
Mediatek et al., "WF on Beam Failure Recovery", 3GPP Draft, 3GPP TSG RAN WG1 Meeting #90bis, R1-1719174_WF_BFDETECTION_V10, 3RD Generation Partnership Project (3GPP), Mobile Competence Centre, 650, Route Des Lucioles, F-06921 Sophia-Antipolis Cedex, France vol. RAN WG1, No. Prague, Czechia, Oct. 9, 2017-Oct. 13, 2017 Oct. 17, 2017 (Oct. 17, 2017), XP051353640, 10 Pages, Retrieved from the Internet: URL:http://www.3gpp.org/ftp/tsg_ran/WG1_RL1/TSGR1_90b/Dots/ retrieved on Oct. 17, 2017].
Supplementary European Search Report—EP18879825—Search Authority—Munich—dated Jul. 1, 2021.
ZTE Corporation, et al., "Discussion on The Beam Failure Recovery Impact on RAN2", 3GPP Draft, 3GPP TSG-RAN WG2 Meeting #100, R2-1713406 Discussion on The Beam Failure Recovery Impact on RAN2, 3RD Generation Partnership Project (3GPP), Mobile Competence Centre, 650, Route Des Lucioles, F-06921 Sophia-Antipolis, vol. RAN WG2, No. Reno, USA, Nov. 27, 2017-Dec. 1, 2017 Nov. 16, 2017 (Nov. 16, 2017), XP051371229, 13 Pages, Retrieved from the Internet: URL:http://www.3gpp.org/ftp/tsg%5Fran/WG2%5FRL2/TSGR2%5F100/Docs/[retrieved on Nov. 16, 2017].
ZTE Corporation., et al., "Discussion on the Beam Failure Recovery Impact on RAN2", 3GPP TSG-RAN WG2 Meeting #100, R2-1713406, Reno, USA, Nov. 27-Dec. 1, 2017, 5 Pages.

* cited by examiner

DETERMINING BEAM FAILURE BASED ON A DYNAMIC RANGE OF TRANSMISSION POWER RATIOS

CROSS REFERENCES

The present Application is a 371 national phase filing of International Patent Application No. PCT/CN2018/111978 by Chenxi et al., entitled "Determining Beam Failure Based on a Dynamic Range of Transmission Power Ratios," filed Oct. 25, 2018; and International Patent Application No. PCT/CN2017/111701 by Chenxi et al., entitled "Determining Beam Failure Based on a Dynamic Range of Transmission Power Ratios," filed Nov. 17, 2017, each of which is assigned to the assignee hereof which is hereby incorporated by reference in their entirety.

BACKGROUND

The following relates generally to wireless communication, and more specifically to determining beam failure based on a dynamic range of transmission power ratios.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems (e.g., NR systems) may operate in frequency ranges that are associated with beamformed transmissions between wireless devices. For example, transmissions in millimeter wave (mmW) frequency ranges may be associated with increased signal attenuation (e.g., path loss) as compared to transmissions in non-mmW frequency ranges. As a result, signal processing techniques such as beamforming may be used to combine energy coherently and overcome the path losses in these systems. In some cases, one or more active beams between two wireless devices may become misaligned, a beam may become associated with poor channel conditions, etc., which may adversely affect communications.

SUMMARY

The described techniques relate to improved methods, systems, devices, or apparatuses that support beam failure determination based on a dynamic range of transmission power ratios. Generally, the described techniques provide for beam failure determination based on a dynamic range of transmission power ratios between two reference signals (e.g., a dynamic range of transmission power ratios a base station may use to transmit a channel state information (CSI) reference signal (CSI-RS) and a demodulation reference signal (DMRS) of a physical downlink control channel (PDCCH)). A user equipment (UE) may identify the dynamic range of transmission power ratios that may be used by the base station via indications of transmission power ratio information sent from the base station. Such indications may include information such as a maximum usable transmission power ratio, a minimum usable transmission power ratio, information relating to one or more offsets from some average or predetermined transmission power ratio, etc. The wireless device may use the identified dynamic range of transmission power ratios, along with a CSI-RS measurement, to determine a range of hypothetical PDCCH block error rates (BLERs). Values within the range of hypothetical PDCCH BLERs (e.g., an upper hypothetical PDCCH BLER and/or a lower hypothetical PDCCH BLER) may be compared to a threshold in order to determine a beam failure status (e.g., a beam failure).

A method of wireless communication is described. The method may include identifying a dynamic range of a transmission power ratio between a first reference signal and a second reference signal of a downlink control channel received from a base station, determining a beam failure status based at least in part on the dynamic range of the transmission power ratio, and communicating with the base station in accordance with the beam failure status.

An apparatus for wireless communication is described. The apparatus may include means for identifying a dynamic range of a transmission power ratio between a first reference signal and a second reference signal of a downlink control channel received from a base station, means for determining a beam failure status based at least in part on the dynamic range of the transmission power ratio, and means for communicating with the base station in accordance with the beam failure status.

Another apparatus for wireless communication is described. The apparatus may include a processor, memory in electronic communication with the processor, and instructions stored in the memory. The instructions may be operable to cause the processor to identify a dynamic range of a transmission power ratio between a first reference signal and a second reference signal of a downlink control channel received from a base station, determine a beam failure status based at least in part on the dynamic range of the transmission power ratio, and communicate with the base station in accordance with the beam failure status.

A non-transitory computer-readable medium for wireless communication is described. The non-transitory computer-readable medium may include instructions operable to cause a processor to identify a dynamic range of a transmission power ratio between a first reference signal and a second reference signal of a downlink control channel received from a base station, determine a beam failure status based at least in part on the dynamic range of the transmission power ratio, and communicate with the base station in accordance with the beam failure status.

In some examples of the method, apparatus, and non-transitory computer-readable medium described above, the first reference signal may be a CSI-RS and the second reference signal may be a DMRS of a PDCCH.

In some examples of the method, apparatus, and non-transitory computer-readable medium described above, identifying the dynamic range of the transmission power ratio includes receiving an indication of the dynamic range of the transmission power ratio from the base station.

In some examples of the method, apparatus, and non-transitory computer-readable medium described above, the indication includes a maximum value associated with the dynamic range of the transmission power ratio and a minimum value associated with the dynamic range of the transmission power ratio.

In some examples of the method, apparatus, and non-transitory computer-readable medium described above, the indication includes a maximum positive offset associated with the dynamic range of the transmission power ratio and a maximum negative offset associated with the dynamic range of the transmission power ratio.

In some examples of the method, apparatus, and non-transitory computer-readable medium described above, the indication includes an offset value that represents both a maximum positive offset associated with the dynamic range of the transmission power ratio and a maximum negative offset associated with the dynamic range of the transmission power ratio.

Some examples of the method, apparatus, and non-transitory computer-readable medium described above may further include processes, features, means, or instructions for determining the dynamic range of the transmission power ratio based at least in part on a maximum positive offset, a maximum negative offset, and an average transmission power ratio.

In some examples of the method, apparatus, and non-transitory computer-readable medium described above, the indication may be received via at least one of radio resource control (RRC), a medium access control control element (MAC CE), or downlink control information (DCI).

In some examples of the method, apparatus, and non-transitory computer-readable medium described above, identifying the dynamic range of the transmission power ratio includes receiving an indication of a configuration of the CSI-RS. Some examples of the method, apparatus, and non-transitory computer-readable medium described above may further include processes, features, means, or instructions for determining the dynamic range of the transmission power ratio based at least in part on the indication of the configuration of the CSI-RS. In some cases, the configuration includes at least one of quasi-co-location (QCL) information, a measurement quantity related to the CSI-RS, and a CSI report setting associated with the CSI-RS. In some cases, the indication of the configuration of the CSI-RS is received via RRC signaling.

In some examples of the method, apparatus, and non-transitory computer-readable medium described above, identifying the dynamic range of the transmission power ratio further includes identifying a maximum value associated with the dynamic range of the transmission power ratio and a minimum value associated with the dynamic range of the transmission power ratio based at least in part on the configuration of the CSI-RS.

In some examples of the method, apparatus, and non-transitory computer-readable medium described above, identifying the dynamic range of the transmission power ratio further includes identifying an offset associated with the dynamic range based at least in part on the configuration of the CSI-RS.

In some examples of the method, apparatus, and non-transitory computer-readable medium described above, identifying the dynamic range of the transmission power ratio further includes identifying a maximum positive offset and a maximum negative offset associated with the dynamic range based at least in part on the configuration of the CSI-RS.

In some examples of the method, apparatus, and non-transitory computer-readable medium described above, identifying the dynamic range of the transmission power ratio further includes identifying a maximum CSI-RS to DMRS power ratio and a minimum CSI-RS to DMRS power ratio based at least in part on the configuration of the CSI-RS.

In some examples of the method, apparatus, and non-transitory computer-readable medium described above, identifying the dynamic range of the transmission power ratio includes receiving an indication of a power ratio between the CSI-RS and a physical downlink shared channel (PDSCH) received from the base station. Some examples of the method, apparatus, and non-transitory computer-readable medium described above may further include processes, features, means, or instructions for determining the dynamic range of the transmission power ratio based at least in part on the power ratio between the CSI-RS and the PDSCH.

Some examples of the method, apparatus, and non-transitory computer-readable medium described above may further include processes, features, means, or instructions for determining a beam failure may have occurred based at least in part on the determined beam failure status. Some examples of the method, apparatus, and non-transitory computer-readable medium described above may further include processes, features, means, or instructions for transmitting a beam failure report to the base station.

In some examples of the method, apparatus, and non-transitory computer-readable medium described above, the dynamic range of the transmission power ratio may be identified per CSI-RS resource, per CSI-RS resource set, or per CSI-RS resource setting.

Some examples of the method, apparatus, and non-transitory computer-readable medium described above may further include processes, features, means, or instructions for determining an upper hypothetical PDCCH BLER and a lower hypothetical PDCCH BLER based at least in part on the dynamic range. Some examples of the method, apparatus, and non-transitory computer-readable medium described above may further include processes, features, means, or instructions for determining the beam failure status based at least in part on the upper hypothetical PDCCH BLER, the lower hypothetical PDCCH BLER, or both.

Some examples of the method, apparatus, and non-transitory computer-readable medium described above may further include processes, features, means, or instructions for performing a CSI-RS measurement. Some examples of the method, apparatus, and non-transitory computer-readable medium described above may further include processes, features, means, or instructions for determining the beam failure status based at least in part on the upper hypothetical PDCCH BLER, the lower hypothetical PDCCH BLER, the CSI-RS measurement, or some combination thereof.

A method of wireless communication is described. The method may include identifying a dynamic range of a transmission power ratio between a first reference signal and a second reference signal of a downlink control channel to a UE, transmitting a signal to a UE that facilitates identification of the dynamic range of the transmission power ratio by the UE, receiving a beam failure status report based at least in part on the dynamic range of the transmission power ratio, and communicating with the UE in accordance with the beam failure status report.

An apparatus for wireless communication is described. The apparatus may include means for identifying a dynamic range of a transmission power ratio between a first reference signal and a second reference signal of a downlink control channel to a UE, means for transmitting a signal to a UE that facilitates identification of the dynamic range of the transmission power ratio by the UE, means for receiving a beam failure status report based at least in part on the dynamic range of the transmission power ratio, and means for communicating with the UE in accordance with the beam failure status report.

Another apparatus for wireless communication is described. The apparatus may include a processor, memory in electronic communication with the processor, and instructions stored in the memory. The instructions may be operable to cause the processor to identify a dynamic range of a transmission power ratio between a first reference signal and a second reference signal of a downlink control channel to a UE, transmit a signal to a UE that facilitates identification of the dynamic range of the transmission power ratio by the UE, receive a beam failure status report based at least in part on the dynamic range of the transmission power ratio, and communicate with the UE in accordance with the beam failure status report.

A non-transitory computer-readable medium for wireless communication is described. The non-transitory computer-readable medium may include instructions operable to cause a processor to identify a dynamic range of a transmission power ratio between a first reference signal and a second reference signal of a downlink control channel to a UE, transmit a signal to a UE that facilitates identification of the dynamic range of the transmission power ratio by the UE, receive a beam failure status report based at least in part on the dynamic range of the transmission power ratio, and communicate with the UE in accordance with the beam failure status report.

In some examples of the method, apparatus, and non-transitory computer-readable medium described above, the first reference signal may be a CSI-RS and the second reference signal may be a DMRS of a PDCCH.

In some examples of the method, apparatus, and non-transitory computer-readable medium described above, the signal includes an indication of the dynamic range of the transmission power ratio.

In some examples of the method, apparatus, and non-transitory computer-readable medium described above, the indication includes a maximum value associated with the dynamic range of the transmission power ratio and a minimum value associated with the dynamic range of the transmission power ratio.

In some examples of the method, apparatus, and non-transitory computer-readable medium described above, the indication includes a maximum positive offset associated with the dynamic range of the transmission power ratio and a maximum negative offset associated with the dynamic range of the transmission power ratio.

In some examples of the method, apparatus, and non-transitory computer-readable medium described above, the indication includes an offset value that represents both a maximum positive offset associated with the dynamic range of the transmission power ratio and a maximum negative offset associated with the dynamic range of the transmission power ratio.

In some examples of the method, apparatus, and non-transitory computer-readable medium described above, the dynamic range of the transmission power ratio may be determined based at least in part on a maximum positive offset, a maximum negative offset, and an average transmission power ratio.

In some examples of the method, apparatus, and non-transitory computer-readable medium described above, the indication may be transmitted via at least one of RRC, a MAC CE, or DCI.

Some examples of the method, apparatus, and non-transitory computer-readable medium described above may further include processes, features, means, or instructions for transmitting an indication of a configuration of the CSI-RS, where the configuration indicates the dynamic range of the transmission power ratio. In some cases, the configuration includes at least one of QCL information, a measurement quantity related to the CSI-RS, and a CSI report setting associated with the CSI-RS. In some cases, the indication of the configuration of the CSI-RS is received via RRC signaling.

In some examples of the method, apparatus, and non-transitory computer-readable medium described above, the indication of the configuration indicates at least one of an offset associated with the dynamic range, a maximum positive offset associated with the dynamic range, a maximum negative offset associated with the dynamic range, a maximum CSI-RS to DMRS power ratio, and a minimum CSI-RS to DMRS power ratio.

Some examples of the method, apparatus, and non-transitory computer-readable medium described above may further include processes, features, means, or instructions for transmitting an indication of a power ratio between the CSI-RS and a PDSCH received from the base station, where the dynamic range of the transmission power ratio may be based at least in part on the power ratio between the CSI-RS and the PDSCH.

Some examples of the method, apparatus, and non-transitory computer-readable medium described above may further include processes, features, means, or instructions for identifying that the beam failure status report may be based on an upper hypothetical PDCCH BLER, a lower hypothetical PDCCH BLER, or both, where the upper hypothetical PDCCH BLER and the lower hypothetical PDCCH BLER may be derived from the dynamic range of the transmission power ratio. Some examples of the method, apparatus, and non-transitory computer-readable medium described above may further include processes, features, means, or instructions for determining a beam failure may have occurred based at least in part on the received beam failure status report.

In some examples of the method, apparatus, and non-transitory computer-readable medium described above, the dynamic range of the transmission power ratio may be identified per CSI-RS resource, per CSI-RS resource set, or per CSI-RS resource setting.

DETAILED DESCRIPTION

Figure 1:
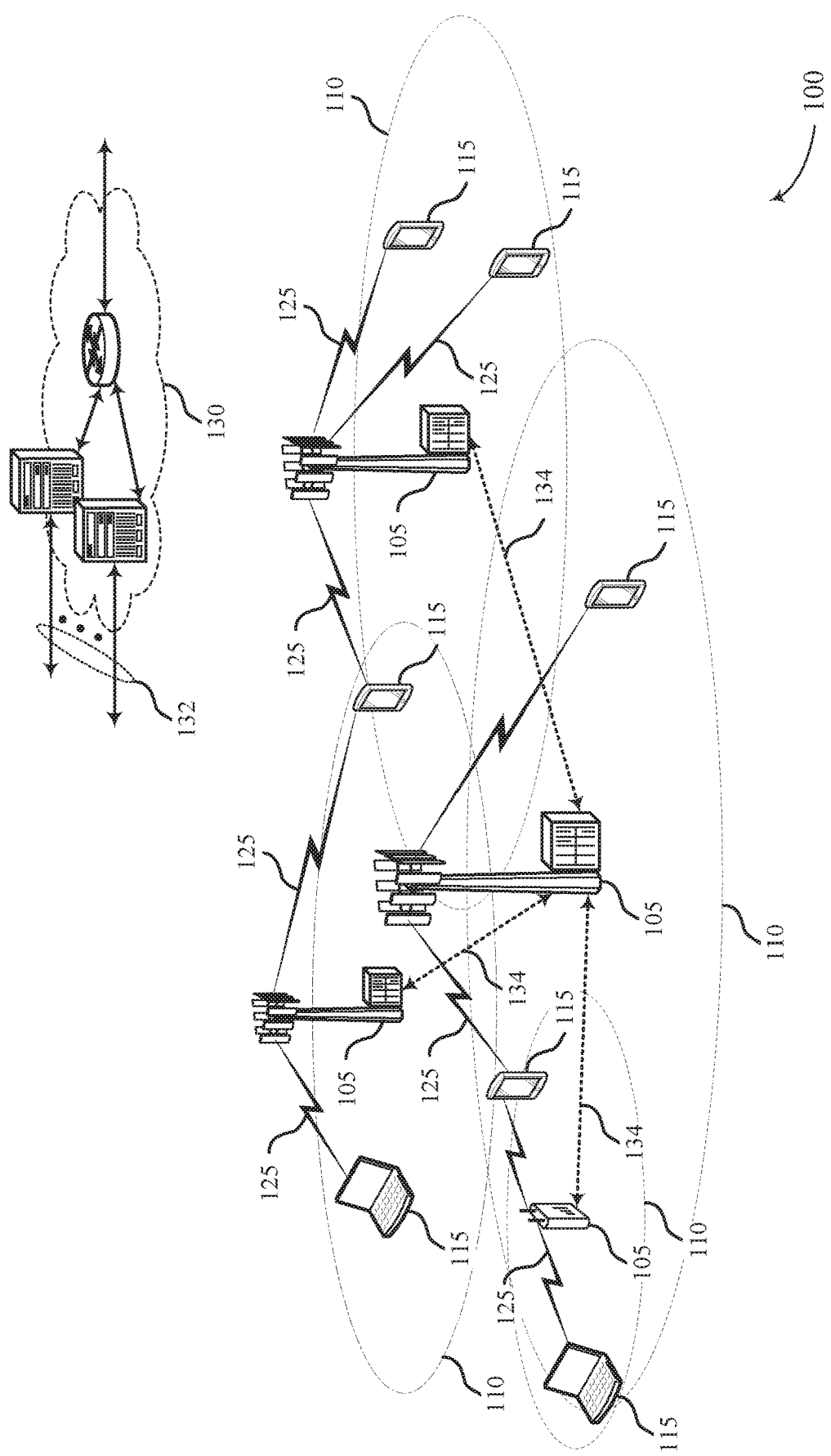
FIG. 1 illustrates an example of a wireless communications system that supports determining beam failure based on a dynamic range of transmission power ratios in accordance with aspects of the present disclosure.

Some wireless communication systems may operate in frequency ranges that support beamformed transmissions between wireless devices. For example, communications in millimeter wave (mmW) frequency bands may experience increased signal attenuation (e.g., path loss). As a result, signal processing techniques such as beamforming may be used to combine energy coherently and overcome the path losses in these systems. In such systems, wireless devices, such as a user equipment (UEs) and base stations, may be able to communicate over one or more active beams, which may correspond to a transmit beam used at the transmitting device and a receive beam at a receiving device (e.g., a beam pair). In some cases, the active beam pair(s) may become misaligned such that the UE and base station may not be able to communicate over the obstructed beam or active beam pair (e.g., due to beam switch failure or signal blockage, a beam may become associated with poor channel conditions, etc.).

A UE may accordingly determine a beam failure (e.g., by monitoring reference signals) on the active beams used to communicate with the base station. For example, a UE may perform a measurement of a channel (e.g., associated with a beam or active beam pair) via a channel state information (CSI) reference signal (CSI-RS) transmitted by the base station. The UE may use the CSI-RS measurement, along with a transmission power ratio between the CSI-RS and a demodulation reference signal (DMRS) of the physical downlink control channel (PDCCH), to determine a hypothetical PDCCH block error rate (BLER). The hypothetical PDCCH BLER may then be compared to some predetermined threshold (e.g., a beam failure trigger threshold) in order to determine a beam failure status (e.g., to determine whether the beam is suitable, or determine a beam failure).

In some cases, the transmission power ratio (e.g., $P_c\_PDCCH\_DMRS$) between the CSI-RS and the PDCCH may be preconfigured (e.g., according to some average transmission power ratio used or to be used by the base station). However, in actual implementation, the actual power ratio used by the base station for transmission of the CSI-RS and the PDCCH may be within some dynamic range (e.g., ±dB). As such, according to techniques described herein, the UE may be made aware of the dynamic range of the transmission power ratio used by the base station in order to determine a hypothetical PDCCH BLER, or a range of hypothetical PDCCH BLERs. The UE may thus use values within the determined range of hypothetical PDCCH BLERs (e.g., hypothetical maximum PDCCH BLER and/or a hypothetical minimum PDCCH BLER), along with a beam failure trigger threshold of some predetermined value, to determine beam failure status. As such, wireless communications systems may have increased flexibility in beam failure reporting requirements (e.g., by determining beam failure based on a range of hypothetical PDCCH BLERs), which may be implemented according to system needs (e.g., based on traffic priority, BLER requirements, etc.).

In one example, the network (e.g., a base station) may explicitly signal the dynamic range of transmission power ratios used for the CSI-RS and the PDCCH. In some cases, the network may determine a power margin, which includes a maximum positive offset and a maximum negative offset and signal the power margin along with the power ratio (e.g., an average power ratio) to the UE. In other cases, the network may signal a maximum power ratio (e.g., the power ratio+maximum positive offset) and a minimum power ratio (e.g., the power ratio+maximum negative offset) to the UE. In a second example, the dynamic range of power ratios may be predetermined (e.g., and identified via a lookup table). In such cases, a power margin, average power ratio, maximum power ratio, minimum power ratio, etc. may depend on the use case of the CSI-RS (e.g., the CSI-RS configuration). In a third example, the dynamic range of power ratios may be implicitly derived from other parameters. In some cases, the hypothetical PDCCH BLER may be calculated using the CSI-RS measurement, along with a transmission power ratio between the CSI-RS and a data transmission (e.g., the physical downlink shared channel (PDSCH)). The transmission power ratio between the CSI-RS and the PDSCH may be included in the CSI-RS configuration, such that when the UE receives the CSI-RS configuration, the UE may implicitly derive a hypothetical range of BLERs. The examples discussed above are further described below with reference to the following figures.

Aspects of the disclosure are initially described in the context of a wireless communications system. An example process flow and flow diagram illustrating discussed techniques are then described. Aspects of the disclosure are further illustrated by and described with reference to apparatus diagrams, system diagrams, and flowcharts that relate to determining beam failure based on a dynamic range of transmission power ratios.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support beam failure identification and recovery techniques.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The core network 130 may provide user authentication, access authorization, tracking, Internet Protocol (IP) connectivity, and other access, routing, or mobility functions. At least some of the network devices, such as a base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may thus support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays (e.g., panels), which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device, or core network 130 supporting radio bearers for user plane data. At the physical (PHY) layer, transport channels may be mapped to physical channels.

In wireless communications system 100, UEs 115 and base stations 105, may communicate over one or more active beams, which may correspond to a transmit beam used at the transmitting device and a receive beam at a receiving device (e.g., a beam pair). Further, downlink beams and uplink beams may utilize different beams, in which the uplink beam may not be derived from the downlink beam. In some cases, an active beam pair, downlink beam, and/or uplink beam may become misaligned (e.g., due to beam switch failure or signal blockage), a beam may become associated with poor channel conditions, etc. such that the UE 115 and base station 105 may not be able to communicate over the obstructed beam or beam pair. Various techniques as discussed herein provide for identification that a certain beam has failed. In some cases, a base station 105 may convey information indicative of a dynamic range of transmission power ratios that may be used for transmission of CSI-RS and DMRS of a PDCCH (e.g., or in other examples, a dynamic range of transmission power ratios that may be used for transmission of CSI-RS and data transmissions of a PDSCH). A UE 115 may identify the dynamic range of transmission power ratios based on the conveyed information and may determine a beam failure status based on the identified range. The base station 105 and UE 115 may then communicate in accordance with the beam failure status, as all discussed in more detail with reference to the following figures.

In some cases, a UE 115 may use an average or predetermined transmission power ratio of a CSI-RS and a DMRS of PDCCH to determine a beam failure status. However, the actual transmission power of the PDCCH may be changed or may vary from slot to slot, meaning that the actual BLER may vary from the hypothetical BLER. Thus, a hypothetical BLER derived from the average or predetermined transmission power ratio alone may not accurately determine a beam failure, as the actual BLER may be lower or higher than the hypothetical BLER. Utilizing a dynamic range of transmission power ratios may mitigate this problem by allowing the UE 115 to derive a best-case scenario hypothetical BLER and a worst-case scenario hypothetical BLER, which may better determine a beam failure status. For instance, if the worst-case hypothetical BLER is below a threshold BLER indicating a beam failure, the chance of a beam failure may be less than if only the BLER derived from the average or predetermined power ratio is below the threshold (e.g., due to the variance between the hypothetical BLER value and the actual one). The UE 115 may thus more accurately determine the beam failure status based on the best-case scenario BLER and/or worst-case scenario BLER.

UE 115 may determine the dynamic range of the transmission power ratio via explicit signaling from a base station 105. Such explicit signaling may indicate a maximum transmission power ratio, a minimum transmission power ratio, a positive and negative offset (e.g., either transmitted as separate values or as a single value that can be applied positively or negatively), an average or a predetermined power transmission ratio, or a combination thereof. One advantage of explicit signaling in this case is that the parameter types sent to the UE 115 may be varied. For instance, the UE 115 may initially receive a maximum transmission power ratio and a minimum transmission power ratio, but may later receive positive offsets, negative offsets, and an average power transmission ratio. Another advantage is that the parameter values sent to the UE 115 may be varied. For example, the UE 115 may initially receive a positive offset value of 3 dB but may later receive a positive offset value of 4 dB.

In some cases, the UE 115 may receive a single offset value that can represent both a maximum positive offset value and a maximum negative offset value. One advantage of using a single offset value is that there may be minimal overhead associated with transmitting a single value. In other cases, the UE 115 may receive a positive offset value and a negative offset value. One advantage of using a maximum positive offset and a maximum negative offset is that the maximum positive and maximum negative offset values may be different from each other in magnitude, which may allow for flexibility in determining best-case and worst-case hypothetical BLER values.

In some cases, the UE 115 may receive the explicit signaling via an RRC or a MAC control element (CE). One advantage of signaling via an RRC or a MAC CE is that signaling via the RRC and MAC CE may be associated with low overhead (e.g., due to their low periodicity). In other cases, the UE 115 may receive the explicit signaling via a DCI. One advantage of utilizing DCI is that DCI may be able to be sent each slot, meaning that the UE 115 may be able to receive updated values of parameters more often.

The UE 115 may also determine the dynamic range of the transmission power ratio based on a CSI-RS configuration associated with the UE 115. For example, a particular CSI-RS configuration may be associated with a particular look-up table which may indicate values for a maximum transmission power ratio, a minimum transmission power ratio, a positive or negative offset (e.g., either listed separately or as one value that may be applied positively or negatively), or a combination thereof. One advantage of determining the dynamic range based on the CSI-RS configuration is that a UE may be able to derive hypothetical BLER values without external guidance.

Figure 2:
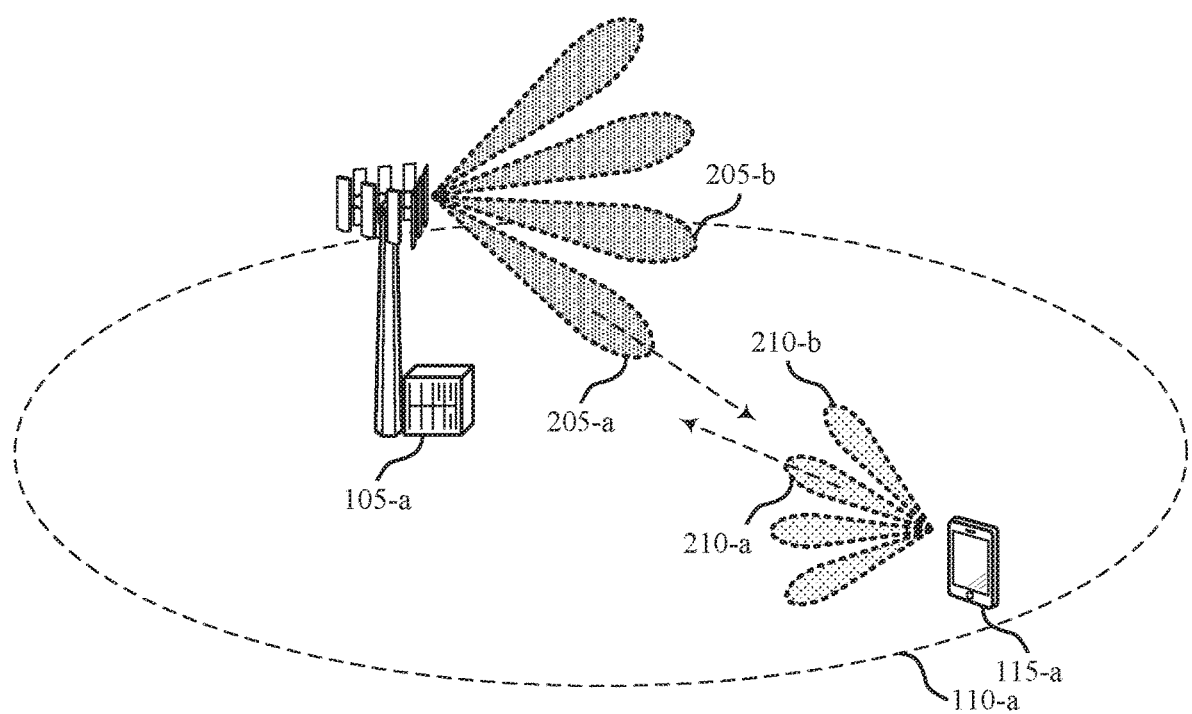
FIG. 2 illustrates an example of a wireless communications system that supports determining beam failure based on a dynamic range of transmission power ratios in accordance with aspects of the present disclosure.

FIG. 2 illustrates an example of a wireless communications system 200 that supports beam failure identification techniques in accordance with various aspects of the present disclosure. Wireless communications system 200 includes a base station 105-a and a UE 115-a, each of which may be an example of the corresponding devices as described with reference to FIG. 1. UE 115-a and base station 105-a may communicate using directional beams and may operate using mmW spectrum, for example. In some cases, UE 115-a and base station 105-a may operate in a spectrum other than the mmW spectrum (e.g., a spectrum with frequencies below six GHz (sub-6 GHz)). The wireless communications system 200 illustrates aspects of identifying beam failure for an active beam pair between UE 115-a and base station 105-a (e.g., an active beam pair associated with a transmit beam 205 and a receive beam 210).

Wireless communications system 200 may operate in frequency ranges that are associated with beamformed transmissions between base station 105-a and UE 115-a. For example, wireless communications system 200 may operate using mmW frequency ranges. As a result, signal processing techniques, such as beamforming, may be used to combine energy coherently and overcome path losses. By way of example, base station 105-a may contain multiple antennas. In some cases, each antenna may transmit (or receive) a phase-shifted version of a signal such that the phase-shifted versions constructively interfere in certain regions and destructively interfere in others. Weights may be applied to the various phase-shifted signals (e.g., in order to steer the transmissions in a desired direction), which may form transmit beams 205. On a receiver side, the signal from each antenna may also be amplified by different weights (e.g., by analogy to the transmitting case). For example, different weighting patterns may be used to achieve the desired sensitivity patterns to form receive beams 210. Such techniques (or similar techniques) may serve to increase the geographic coverage area 110-a of the base station 105-a or otherwise benefit wireless communications system 200. The present example may illustrate an example of downlink transmissions from base station 105-*a* to UE 115-*a*. That is, transmit beams 205 may refer to beams used by base station 105-*a* to transmit downlink transmissions to UE 115-*a*, and receive beams 210 may refer to beams used by UE 115-*a* to receive downlink transmissions from base station 105-*a*. However, techniques described herein may be applied to uplink transmissions (e.g., where base station 105-*a* may determine a beam failure). For example, in uplink transmission scenarios, UE 115-*a* may use transmit beams similar or identical to receive beams 210 to transmit uplink transmissions, and base station 105-*a* may use receive beams similar or identical to transmit beams 205 to receive uplink transmissions. That is, beam failure determination techniques described may be applied to an active beam pair (e.g., an active beam pair including a transmit beam 205-*a* and a receive beam 210-*a*), a downlink beam (e.g., a transmit beam 205), and/or an uplink beam (e.g., a transmit beam similar or identical to a receive beam 210 in scenarios where UE 115-*a* is transmitting uplink transmissions) by analogy, without departing from the scope of the present disclosure.

Transmit beams 205-*a*, 205-*b*, etc. represent examples of beams over which data (e.g., or control information) may be transmitted. Accordingly, each transmit beam 205 may be directed from base station 105-*a* toward a different region of the geographic coverage area 110-*a* and in some cases, two or more beams may overlap. Transmit beams 205 may be used for simultaneous transmissions, beamsweep transmissions, transmissions at different times, etc. In either case, a UE 115-*a* may be capable of receiving the information in one or more receive beams 210. A beam failure may be associated with an active beam pair (e.g., transmit beam 205-*a* and receive beam 210-*a*) becoming misaligned, or a downlink beam or uplink beam becoming associated with poor channel conditions. In some cases, the transmission scenario may be swapped (e.g., UE 115-*a* may be transmitting data which base station 105-*a* may be receiving). In such cases, a transmit beam 205 may be considered a receive beam and a receive beam 210 may be considered a transmit beam. As such, the techniques described herein may be used in an uplink scenario without departing from the scope of the present disclosure.

As discussed above, when operating using mmW frequencies, base station 105-*a* and/or UE 115-*a* may utilize beamforming techniques to increase the strength of wireless signals and mitigate additional path loss. Beamforming techniques may involve base station 105-*a* transmitting multiple downlink beamformed signals (e.g., via transmit beam 205) that carry data and/or control information. For example, base station 105-*a* may transmit a beam reference signal (BRS), a beam refinement reference signal (BRRS), a beam measurement reference signal, a CSI-RS, a beam synchronization signal, an uplink grant, a broadcast signal (e.g., a master information block (MIB) or system information block (SIB)), or any number of other types of downlink messages. Beamformed signals may be transmitted in a shaped or directional manner where each beamformed signal is transmitted in a different direction according to different transmit beams 205. Beamformed signals may be associated with an antenna port precoder configuration (e.g., an analog and/or digital beamforming stage that determines the direction and/or shape of each transmit beam 205) as discussed with reference to FIG. 1. For example, transmit beam 205-*a* may be transmitted in a first direction or shape, transmit beam 205-*b* may be transmitted in a second direction or shape, and transmit beam 205-*c* may be transmitted in a third direction or shape. In some case, the beamformed signals or transmit beam 205 may be transmitted in a sweeping pattern.

In some cases, UE 115-*a* may determine a beam failure (e.g., by monitoring reference signals) on transmit beams 205 or an active beam pair. For example, UE 115-*a* may perform a measurement of a channel (e.g., associated with a beam 205 or active beam pair) via a CSI-RS transmitted by base station 105-*a*. UE 115-*a* may use the CSI-RS measurement, along with a transmission power ratio between the CSI-RS and a DMRS of the PDCCH (e.g., a $P_c\_PDCCH\_DMRS$ ratio), to determine a hypothetical PDCCH BLER. The hypothetical PDCCH BLER may then be compared to some predetermined threshold in order to determine a beam failure status (e.g., to determine whether the beam is suitable or unsuitable, the latter being a beam failure).

In some cases, the transmission power ratio (e.g., $P_c\_PDCCH\_DMRS$) between the CSI-RS and the PDCCH may be preconfigured (e.g., according to some average power ratio used or to be used by base station 105-*a*). However, in actual implementation, the actual power used by base station 105-*a* for transmission of the CSI-RS and the PDCCH may be within some dynamic range (e.g., the power ratio may be associated with some ±dB range). As such, according to techniques described herein, UE 115-*a* may be made aware of a dynamic range of a transmission power ratio used by base station 105-*a* in order to determine a hypothetical PDCCH BLER or a hypothetical range of PDCCH BLERs. UE 115-*a* may, for instance, use a hypothetical maximum PDCCH BLER and/or a hypothetical minimum PDCCH BLER, along with a predetermined threshold, to determine beam failure status. As such, wireless communications systems may have increased flexibility in beam failure reporting requirements (e.g., by determining beam failure based on a range of hypothetical PDCCH BLERs), which may be implemented according to system needs (e.g., based on traffic priority, BLER requirements, etc.).

In the present description, the dynamic range of $P_c\_PDCCH\_DMRS$ (e.g., the CSI-RS and DMRS of PDCCH transmission power ratio) may be based at least in part on some predetermined initial $P_c\_PDCCH\_DMRS$ or some $P_c\_PDCCH\_DMRS$ average value (e.g., an average value of the CSI-RS to DMRS of PDCCH transmission power ratio), which, for the purposes of the discussion, will be labeled as $P_c\_PDCCH\_DMRS_{ref}$. As discussed below, the dynamic range of $P_c\_PDCCH\_DMRS$ may be determined based on indicated offsets from $P_c PDCCH\_DMRS_{ref}$ (e.g., positive and negative offsets from $P_c\_PDCCH\_DMRS_{ref}$ may be used to determine $P_c\_PDCCH\_DMRS_{max} = P_c\_PDCCH\_DMRS_{ref} + \text{max}$ positive offset and $P_c\_PDCCH\_DMRS_{min} = P_c\_PDCCH\_DMRS_{ref} + \text{max}$ negative offset value). In some cases, base station 105-*a* may explicitly signal $P_c\_PDCCH\_DMRS_{ref}$ to the UE 115-*a* via RRC. In other cases, $P_c\_PDCCH\_DMRS_{ref}$ may be implicitly derived from a power ratio between CSI-RS and PDSCH (e.g., $P_c\_PDCCH\_DMRS_{ref}$ may be derived from $P_c\_PDSCH$). In other cases, $P_c\_PDCCH\_DMRS_{ref}$ may be preconfigured (e.g., UE 115-*a* may assume $P_c\_PDCCH\_DMRS_{ref} = 0$ dB for a first CSI-RS configuration, $P_c\_PDCCH\_DMRS_{ref} = 3$ dB for a second CSI-RS configuration, etc.). In yet other cases, the network (e.g., base station 105-*a*) may signal a signal-to-interference plus noise ratio (SINR) threshold for beam failure detection. As discussed herein, $P_c\_PDCCH\_DMRS_{ref}$ may represent an average value, which may be associated with some threshold during actual implementation (e.g., an average $P_c\_$ PDCCH_DMRS, such as $P_c\_PDCCH\_DMRS_{ref}$, may be assumed by the UE 115-a, but the actual $P_c\_PDCCH\_DMRS$ may vary within some ±dB range). As discussed below, the UE 115-a may identify such a range of transmission power ratios (e.g., the dynamic range of actual $P_c\_PDCCH\_DMRS$).

In one example, the network (e.g., base station 105-a) may explicitly signal or indicate the dynamic range of transmission power ratios used for the CSI-RS and the PDCCH (e.g., the dynamic range of $P_c\_PDCCH\_DMRS$). In some cases, the network may determine a power margin, which may include a maximum positive offset from the transmission power ratio (e.g., the average or predetermined transmission power ratio) and a maximum negative offset from the transmission power ratio, and signal the power margin along with the power ratio to UE 115-a. That is, the network may determine a power margin that includes a maximum positive $P_c\_PDCCH\_DMRS$ offset and a maximum negative $P_c\_PDCCH\_DMRS$ offset. In some cases, the margin may include one value (e.g., 3 dB) applied to both the maximum positive offset (e.g., +3 dB from $P_c\_PDCCH\_DMRS_{ref}$) and the maximum negative offset (e.g., -3 dB from $P_c\_PDCCH\_DMRS_{ref}$). In other cases the margin may include two values (e.g., one applied to the maximum positive offset (+3 dB from $P_c\_PDCCH\_DMRS_{ref}$) and a second applied to the maximum negative offset (-6 dB from the $P_c\_PDCCH\_DMRS_{ref}$). As shown, when the power margin is indicated, $P_c\_PDCCH\_DMRS_{ref}$ may also be indicated in order for the UE 115-a to determine the dynamic range of the actual $P_c\_PDCCH\_DMRS$ (e.g., as the UE 115-a may apply the indicated power margin to some $P_c\_PDCCH\_DMRS$ value, such as $P_c\_PDCCH\_DMRS_{ref}$, to determine the dynamic range of $P_c\_PDCCH\_DMRS$).

Additionally or alternatively, the network may signal the maximum power ratio (e.g., $P_c\_PDCCH\_DMRS_{ref}$+maximum positive offset) and the minimum power ratio (e.g., $P_c\_PDCCH\_DMRS_{ref}$+maximum negative offset) to the UE 115-a (e.g., instead of or in addition to signaling the power margin). In cases where the maximum $P_c\_PDCCH\_DMRS$ and minimum $P_c\_PDCCH\_DMRS$ values are signaled, the UE 115-a may choose to not use $P_c\_PDCCH\_DMRS_{ref}$, as the dynamic range of $P_c\_PDCCH\_DMRS$ may be explicitly indicated by the maximum and minimum $P_c\_PDCCH\_DMRS$ values. Such a network configuration (e.g., explicit signaling) of $P_c\_PDCCH\_DMRS_{ref}$ along with an associated power margin, maximum and minimum $P_c\_PDCCH\_DMRS$ values of a dynamic range of transmission power ratios, etc. may be conveyed via upper layer signaling (e.g., RRC, MAC CE, etc.) or via lower layer signaling (e.g., downlink control information (DCI), etc.). Further, such information may be per CSI-RS resource, per CSI-RS resource set, per CSI-RS resource setting, etc.

In a second example, the dynamic range of transmission power ratios may be predetermined (e.g., and identified by UE 115-a via a lookup table). In such cases, a power margin, average power ratio, maximum power ratio, minimum power ratio, etc. may depend on the configuration of the CSI-RS (e.g., the CSI-RS usage configuration, measurement configuration, etc.). For example, Table 2.1, Table 2.2. and Table 2.3 may illustrate lookup tables or values configured by the network. UE 115-a may be preconfigured with such information. In the following tables, 'Case A' and 'Case B' may refer to different configurations of CSI-RS. The configuration may include the quasi-co-location (QCL) information, a measurement configuration, a CSI report setting configuration associated with the CSI-RS resource, etc. For example, Case A may refer to CSI-RS with QCL type A, and Case B may refer to CSI-RS with QCL type B. In other examples, Case A may refer to CSI-RS for CSI acquisition, and Case B may refer to CSI-RS used for reference signal received power (RSRP) measurement, etc. The UE 115-a may utilize such CSI-RS resources, and implicitly derive transmission power information, according to different configurations.

TABLE 2.1

|  | Case A | Case B |
|---|---|---|
| Offset | 3 dB | 6 dB |

TABLE 2.2

|  | Case A | Case B |
|---|---|---|
| Maximum Positive Offset | +3 dB | +6 dB |
| Maximum Negative Offset | -4 dB | -8 dB |

TABLE 2.3

|  | Case A | Case B |
|---|---|---|
| $P_c\_PDCCH\_DMRS_{max}$ | +6 dB | +9 dB |
| $P_c\_PDCCH\_DMRS_{min}$ | -1 dB | -5 dB |

Table 2.1 and Table 2.2 illustrate example power margins that may be associated with different configurations of CSI-RS. Table 2.1 may illustrate a single margin being applied to both a maximum positive offset and a maximum negative offset. For example, for Case A, the maximum positive offset may be 3 dB and the maximum negative offset may be -3 dB. Therefore, the UE 115-a may, based on the Case A CSI-RS configuration, determine a dynamic range of $P_c\_PDCCH\_DMRS$ using the power margin (e.g., the $P_c\_PDCCH\_DMRS$ may range from ($P_c\_PDCCH\_DMRS_{ref}$+3) dB to ($P_c\_PDCCH\_DMRS_{ref}$-3) dB)Table 2.2 may illustrate a first margin being applied to a maximum positive offset and a second margin being applied to a maximum negative offset. For example, for Case A, the maximum positive offset may be 3 dB and the maximum negative offset may be -4 dB. Therefore, the UE 115-a may, based on the Case A CSI-RS configuration, determine a dynamic range of $P_c\_PDCCH\_DMRS$ using the power margin (e.g., the $P_c\_PDCCH\_DMRS$ may range from $P_c\_PDCCH\_DMRS_{max}$=($P_c\_PDCCH\_DMRS_{ref}$+3) dB to $P_c\_PDCCH\_DMRS_{min}$=($P_c\_PDCCH\_DMRS_{ref}$-4) dB). Table 2.3 may illustrate an example where the maximum and minimum $P_c\_PDCCH\_DMRS$ values of the dynamic range of $P_c\_PDCCH\_DMRS$ are directly indicated or preconfigured. For example, for Case A, the $P_c\_PDCCH\_DMRS$ may be directly indicated to range from +6 dB (e.g., $P_c\_PDCCH\_DMRS_{max}$) to -1 dB (e.g., $P_c\_PDCCH\_DMRS_{min}$).

Therefore, the network may determine the configuration of the CSI-RS resource, know the associated power margin or maximum and minimum $P_c\_PDCCH\_DMRS$ values, and signal, to UE 115-a, an indication of the configuration of the CSI-RS resource (e.g., via RRC signaling). Based on the configuration of the CSI-RS resource, the UE 115-a be aware of the power margin and/or maximum and minimum $P_c\_PDCCH\_DMRS$ values according to Table 2.1, Table 2.2, and/or Table 2.3. The entries and CSI-RS configurations are for illustrative purposes only. Other offset values, maximum and minimum $P_c\_PDCCH\_DMRS$ values, etc. for different CSI-RS configurations may be implemented or preconfigured by the network by analogy, without departing from the scope of the present disclosure.

In a third example, the dynamic range of power ratios may be implicitly derived from other parameters. In some cases, the hypothetical PDCCH BLER may be calculated using the CSI-RS measurement, along with a dynamic range of the $P_c\_PDCCH\_DMRS$ calculated based on the transmission power ratio between the CSI-RS and a data transmission (e.g., the PDSCH). The transmission power ratio between the CSI-RS and the PDSCH (e.g., $P_c\_PDSCH$) may be included in the CSI-RS configuration, such that when UE 115-a receives the CSI-RS configuration, UE 115-a may implicitly derive a hypothetical range of BLERs based on the $P_c\_PDSCH$. That is, the dynamic range of $P_c\_PDCCH\_DMRS$ may be determined by other parameters such as $P_c\_PDSCH$. As an example, UE 115-a may receive an indication of both $P_c\_PDSCH$ and $P_c\_PDCCH\_DMRS_{ref}$ (e.g., an average $P_c\_PDCCH\_DMRS$ value or a predetermined one). Based on the difference between the received $P_c\_PDSCH$ and $P_c\_PDCCH\_DMRS_{ref}$, UE 115-a may be able to determine an offset value. For example, if $P_c\_PDSCH=10$ dB and $P_c\_PDCCH\_DMRS_{ref}=7$ dB, then the offset value may be 3 dB (e.g., because $P_c\_PDSCH-P_c\_PDCCH\_DMRS_{ref}=3$ dB), meaning that $P_c\_PDCCH\_DMRS_{max}=10$ dB and $P_c\_PDCCH\_DMRS_{min}=4$ dB.

Therefore, the network may signal or indicate a CSI-RS resource configuration to UE 115-a (e.g., via base station 105-a), and the configuration may include at least $P_c\_PDSCH$ information. The network may be aware of the dynamic range of $P_c\_PDCCH\_DMRS$ based on the $P_c\_PDSCH$ and the $P_c\_PDCCH\_DMRS$/configured SINR threshold (e.g., as discussed above). UE 115-a may receive the CSI-RS configuration and determine the dynamic range of the $P_c\_PDCCH\_DMRS$ accordingly.

The examples described above describe methods by which UE 115-a may identify a dynamic range of $P_c\_PDCCH\_DMRS$. The dynamic range of $P_c\_PDCCH\_DMRS$ may be used along with CSI-RS measurements to determine a range of hypothetical PDCCH BLERs (e.g., a hypothetical range of PDCCH BLERs). For example, the hypothetical range of PDCCH BLERs may be determined based on the limits of the dynamic range of the $P_c\_PDCCH\_DMRS$. That is, an upper hypothetical PDCCH BLER may be determined based on the measured CSI and the determined $P_c\_PDCCH\_DMRS_{min}$ value, and a lower hypothetical PDCCH BLER may be determined based on the measured CSI and the determined $P_c\_PDCCH\_DMRS_{max}$ value. In some cases, determination of the hypothetical range of PDCCH BLERs may refer to such a determination of upper and lower hypothetical PDCCH BLERs. UE 115-a may then compare the hypothetical range of PDCCH BLERs to a threshold to determine or identify whether or not a beam has failed, as further described below with reference to FIG. 4.

In some cases, upon identification or detection of a beam failure, a beam recovery procedure may be initiated in which an indication of a beam failure may be transmitted using scheduling request (SR), a random access channel (RACH) resource, a physical uplink control channel (PUCCH) resource, etc. In some cases, base station 105-a may transmit an indication that one of a set of beams may have failed, and UE 115-a may provide an indication of which beam of the set of beams failed, such as based on a received reference signal associated with one of the beams. In other cases, UE 115-a may transmit a beam failure report to base station 105-a, indicating the beam failure.

Figure 3:
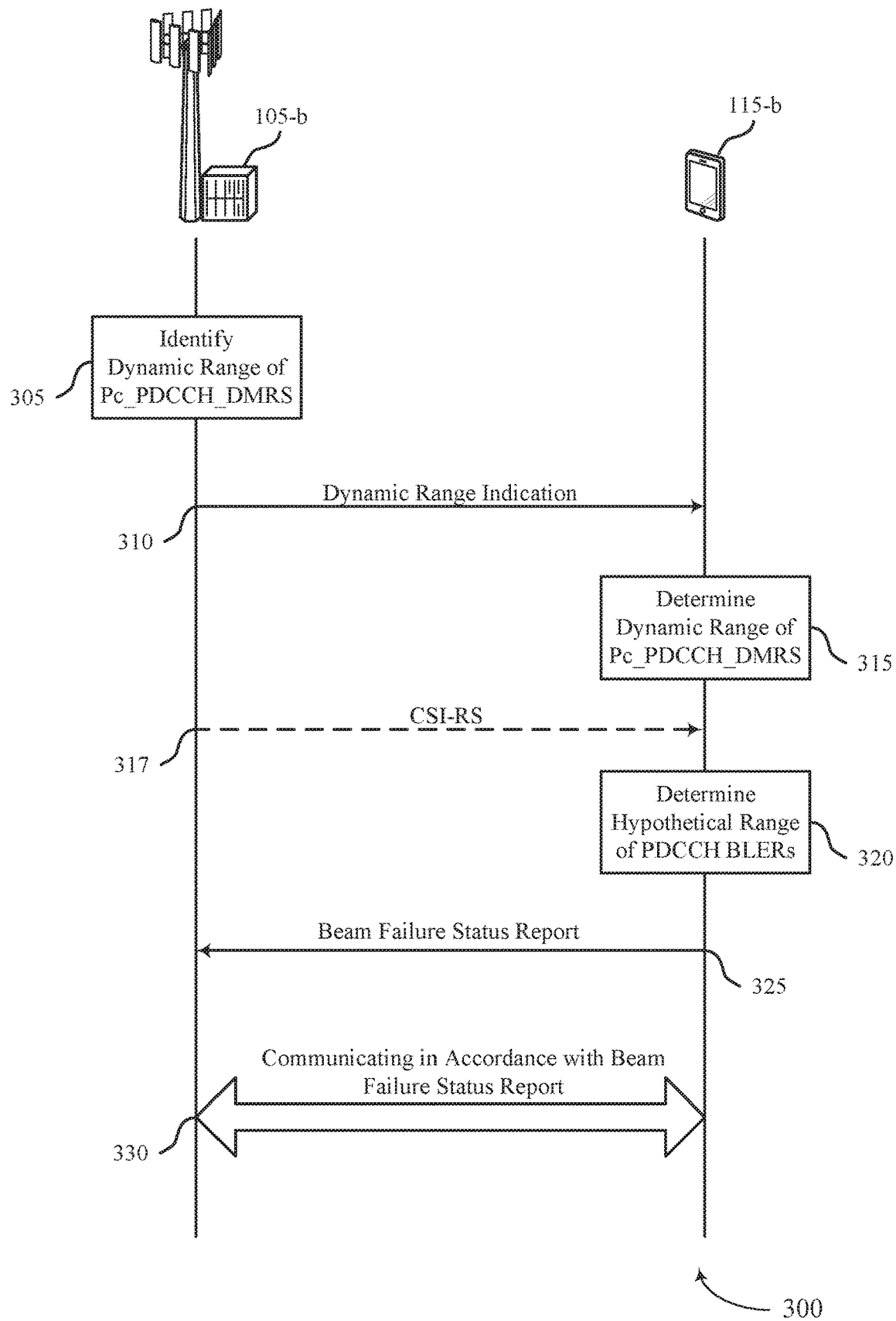
FIG. 3 illustrates an example of a process flow that supports determining beam failure based on a dynamic range of transmission power ratios in accordance with aspects of the present disclosure.

FIG. 3 illustrates an example of a process flow 300 that supports determining beam failure based on a dynamic range of transmission power ratios in accordance with various aspects of the present disclosure. In some examples, process flow 300 may implement aspects of wireless communications system 100 and/or wireless communications system 200. Process flow 300 includes a base station 105-b and a UE 115-b, each of which may be an example of the corresponding devices as described with reference to FIGS. 1 and 2. UE 115-b and base station 105-b may communicate using directional beams and may operate using mmW spectrum, for example. In some cases, UE 115-b and base station 105-b may operate in a spectrum other than the mmW spectrum (e.g., a spectrum with frequencies below six GHz (sub-6 GHz)). The process flow 300 illustrates aspects of identifying beam failure associated with communications between UE 115-b and base station 105-b. Further, the ordering of steps shown is done so for illustrative purposes only. Steps may be interchanged, and steps may be added or removed to process flow 300 without departing from the scope of the present disclosure.

At 305, base station 105-b may identify a dynamic range of a transmission power ratio between a first reference signal and a second reference signal of a downlink control channel to UE 115-b. In the present example, base station 105-b may identify a dynamic range of a transmission power ratio between a CSI-RS and a DMRS of a PDCCH (e.g., a dynamic range of $P_c\_PDCCH\_DMRS$).

At 310, base station 105-b may indicate the dynamic range of the transmission power ratio (e.g., the dynamic range of $P_c\_PDCCH\_DMRS$). As discussed above, such an indication may take several forms. For example, the indication may be an explicit indication of a maximum value associated with the dynamic range of the transmission power ratio (e.g., $P_c\_PDCCH\_DMRS_{max}$) and/or a minimum value associated with the dynamic range of the transmission power ratio (e.g., $P_c\_PDCCH\_DMRS_{min}$). In other cases, the indication may be an explicit indication of an offset that represents both a maximum positive offset associated with the dynamic range of the transmission power ratio and a maximum negative offset associated with the dynamic range of the transmission power ratio. In other cases, the indication may be an explicit indication of two individual offsets for the maximum positive offset associated with the dynamic range of the transmission power ratio and the maximum negative offset associated with the dynamic range of the transmission power ratio (e.g., both a maximum positive offset and a maximum negative offset associated with $P_c\_PDCCH\_DMRS$). The indication may be conveyed via upper layer signaling (e.g., RRC, MAC CE, etc.) or via lower layer signaling (e.g., DCI, etc.). Further, such $P_c\_PDCCH\_DMRS$ information may be per CSI-RS resource, per CSI-RS resource set, per CSI-RS resource setting, etc.

At 315, UE 115-b may determine the dynamic range of the transmission power ratio or the $P_c\_PDCCH\_DMRS$ based on the indication received at 310. For example, if the indication included the maximum and minimum transmission power ratios (e.g., $P_c\_PDCCH\_DMRS_{max}$ and $P_c\_PDCCH\_DMRS_{min}$), UE 115-b may directly determine the dynamic range of the $P_c\_PDCCH\_DMRS$ to be from $P_c\_PDCCH\_DMRS_{min}$ to $P_c\_PDCCH\_DMRS_{min}$. In other example, if the indication includes offset information, UE 115-b may apply the offset information to an average or predetermined $P_c\_PDCCH\_DMRS$ value (e.g., $P_c\_PDCCH\_DMRS_{ref}$) in order to determine the range. That is, if the indication included a maximum positive offset and a maximum negative offset, the UE 115-b may determine the dynamic range of the $P_c$_PDCCH_DMRS to be from $P_c$_PDCCH_DMRS$_{min}$=$P_c$_PDCCH_DMRS$_{ref}$−maximum negative offset to $P_c$_PDCCH_DMRS$_{max}$=$P_c$_PDCCH_DMRS$_{ref}$+maximum positive offset.

In other cases, the dynamic range of the $P_c$_PDCCH_DMRS may be implicitly derived. For example, in such cases, the indication at 310 may refer to an indication of a configuration of the CSI-RS (e.g., which may just be the CSI-RS itself). In such cases, the UE 115-b may implicitly derive $P_c$_PDCCH_DMRS information (e.g., $P_c$_PDCCH_DMRS$_{min}$ value, $P_c$_PDCCH_DMRS$_{max}$ value, maximum positive and negative offsets, etc.) from the indication of the configuration (e.g., as discussed in more detail above with reference to FIG. 2). In some cases, the CSI-RS configuration includes QCL information, a measurement quantity (e.g., a link configuration) related to the CSI-RS, a CSI report setting associated with the CSI-RS, etc. In some cases, the indication of the configuration of the CSI-RS is received via RRC signaling.

At 317, base station 105-b may transmit a CSI-RS. UE 115-b may receive the CSI-RS from base station 105-b.

At 320, UE 115-b may determine a hypothetical range of PDCCH BLERs based on the determined dynamic range of $P_c$_PDCCH_DMRS. For example, the hypothetical range of PDCCH BLERs may be determined based on the limits of the dynamic range of the $P_c$_PDCCH_DMRS. That is, a upper hypothetical PDCCH BLER may be determined based on the measured CSI (e.g., received at 317 or 310 depending on the implementation scenario) and the $P_c$_PDCCH_DMRS$_{min}$, and a lower hypothetical PDCCH BLER may be determined based on the measured CSI and the $P_c$_PDCCH_DMRS$_{max}$. Determination of the hypothetical range of PDCCH BLERs may refer to such a determination of upper and lower hypothetical PDCCH BLERs.

At 325, UE 115-b may compare the hypothetical range of PDCCH BLERs to a threshold, determine a beam failure status, and transmit a beam failure status report to the base station 105-b. Determination of the beam failure status (e.g., comparison of the hypothetical range of PDCCH BLERs to a threshold) is further described below with reference to FIG. 4.

At 330, base station 105-b and UE 115-b may communicate in accordance with the beam failure status report. For example, the base station 105-b and UE 115-b may resume or continue communications via the beam (e.g., if no beam failure is indicated in the beam failure status report at 325). Additionally or alternatively, the base station 105-b and UE 115-b may initiate a beam recovery procedure (e.g., if a beam failure is indicated in the beam failure status report at 325), etc.

Figure 4:
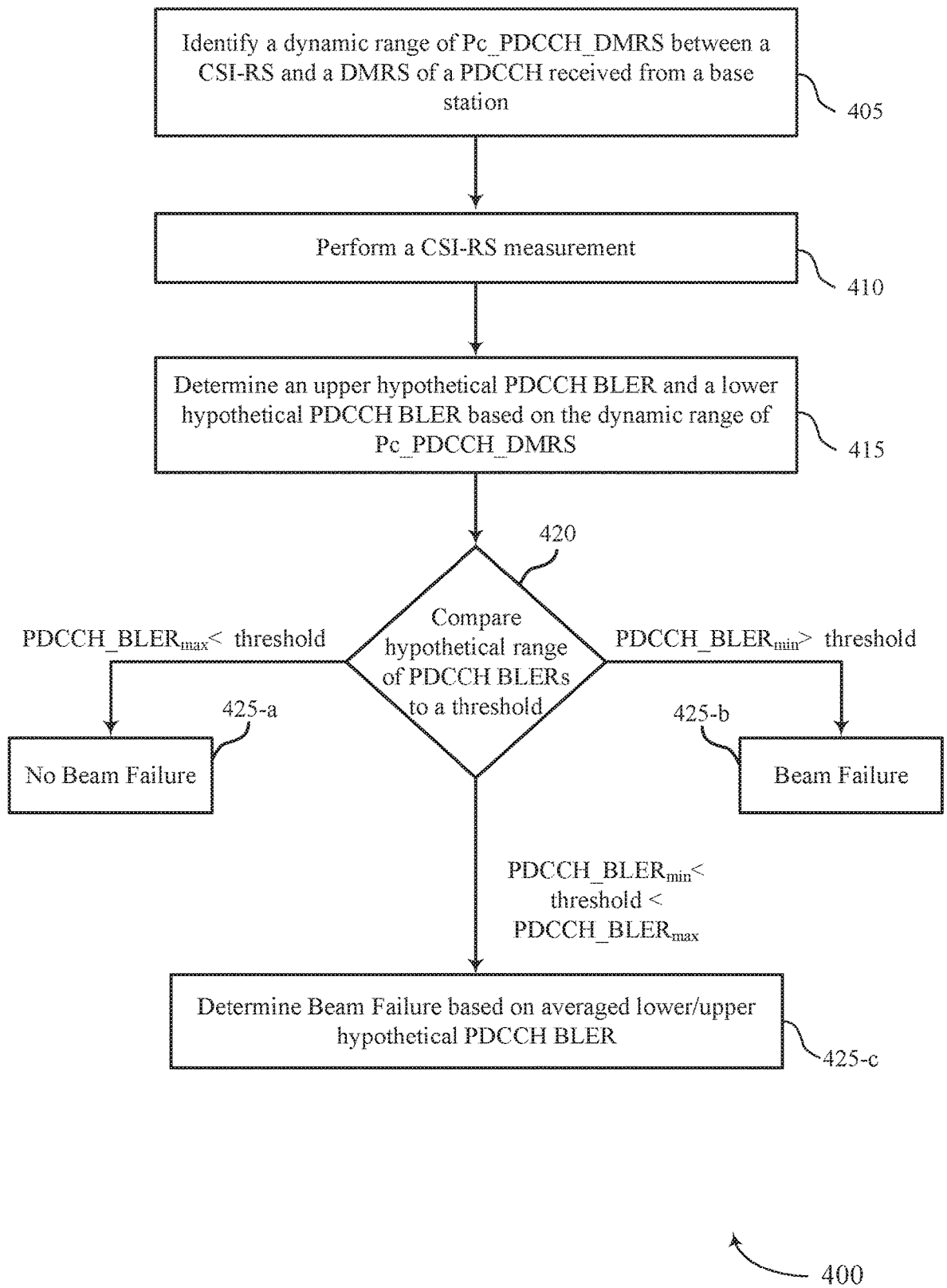
FIG. 4 illustrates an example of a flow diagram that supports determining beam failure based on a dynamic range of transmission power ratios in accordance with aspects of the present disclosure.

FIG. 4 illustrates an example of a flow diagram 400 that supports determining beam failure based on a dynamic range of transmission power ratios in accordance with various aspects of the present disclosure. In some examples, flow diagram 400 may implement aspects of wireless communications system 100 and/or wireless communications system 200. Flow diagram 400 may illustrate operations of a UE 115 to determine beam failure using a dynamic range of $P_c$_PDCCH_DMRS.

At 405, the UE 115 may identify a dynamic range of transmission power ratios between a CSI-RS and a DMRS of a PDCCH usable by a base station 105. The dynamic range of $P_c$_PDCCH_DMRS may refer to a range of transmission power levels the base station 105 may use to transmit CSI-RS and a DMRS of a PDCCH to the UE 115. The dynamic range of transmission power ratios may be identified based on $P_c$_PDCCH_DMRS information indicated by the base station 105. Such information may be explicitly indicated (e.g., separate from a CSI-RS) or, in some cases, may be implicitly derived by the UE 115 (e.g., based on the configuration of the CSI-RS).

At 410, the UE 115 may perform a CSI-RS measurement. In cases where the $P_c$_PDCCH_DMRS information is implicitly derived, 405 and 410 may occur at the same time (e.g., the $P_c$_PDCCH_DMRS information may be derived from the CSI-RS itself, or the $P_c$_PDCCH_DMRS information may be identified as a separate step or from a separate indication).

At 415, the UE 115 may determine a range of hypothetical PDCCH BLERs based on the identified dynamic range of transmission power ratios and the measured CSI-RS. For example, a minimum value of the dynamic range of transmission power ratios and the measured CSI-RS may be used to determine a maximum hypothetical PDCCH BLER (e.g., an upper hypothetical PDCCH BLER). Further, a maximum value of the dynamic range of transmission power ratios and the measured CSI-RS may be used to determine a minimum hypothetical PDCCH BLER (e.g., a lower hypothetical PDCCH BLER).

At 420, the UE 115 may compare one or more hypothetical PDCCH BLER values (e.g., an upper hypothetical PDCCH BLER, a lower hypothetical PDCCH BLER, an average hypothetical PDCCH BLER, etc.) to a threshold to determine a beam failure status. Values within the range of hypothetical PDCCH BLERs used to compare to a threshold for beam failure determination may affect the likelihood of detecting or identifying a beam failure. That is, based on which values within the range of hypothetical PDCCH BLERs are compared to the threshold, the UE 115 may report beam failure more aggressively or more conservatively, depending on system needs, UE preference, etc. The following may illustrate an example of conservative beam failure detection techniques, however other (e.g., aggressive or less conservative) techniques may be implemented by analogy (e.g., by comparing other values within the range of hypothetical PDCCH BLERs to a beam failure trigger threshold), without departing from the scope of the present disclosure.

For example, at 425-a, if the UE 115 determines a maximum hypothetical PDCCH BLER (e.g., an upper hypothetical PDCCH BLER) is less than some threshold BLER that would trigger a beam failure, no beam failure may be reported. Such may exemplify conservative beam failure detection techniques, as the UE 115 may be comparing the worst-case scenario BLER to the beam failure trigger threshold. If the worst-case scenario BLER is still less than some threshold that would trigger beam failure, the UE 115 may report a beam failure status of no beam failure (e.g., the beam is suitable under the worst-case scenario).

At 425-b, if the UE 115 determines a minimum hypothetical PDCCH BLER (e.g., a lower hypothetical PDCCH BLER) is greater than some threshold BLER that would trigger a beam failure, a beam failure may be reported. Such may exemplify conservative beam failure detection techniques, as the UE 115 may be comparing the best-case scenario BLER to the beam failure trigger threshold. If the best-case scenario BLER is still greater than some threshold that triggers beam failure, the UE 115 may report a beam failure status indicating beam failure (e.g., the beam is not suitable under the best-case scenario).

At 425-c, if a UE 115 determines a minimum hypothetical PDCCH BLER is less than a beam failure trigger threshold, yet the beam failure trigger threshold is still less than the maximum hypothetical PDCCH BLER, the UE 115 may compute an average lower/upper hypothetical PDCCH BLER (e.g., using previous measurements). The averaged lower/upper hypothetical PDCCH BLERs may then be used to determine beam failure. For example, if the average upper hypothetical PDCCH BLER is less than a beam failure trigger threshold, no beam failure may be reported, but if the average lower hypothetical PDCCH BLER is greater than the threshold, then a beam failure may be reported. If the average upper hypothetical PDCCH BLER is greater than the threshold, but the average lower hypothetical PDCCH BLER is below the threshold, UE 115-*a* may recompute the averages using other values (e.g., using more values or using different values than the one used to compute the initial average upper and lower hypothetical PDCCH BLERs).

Figure 5:
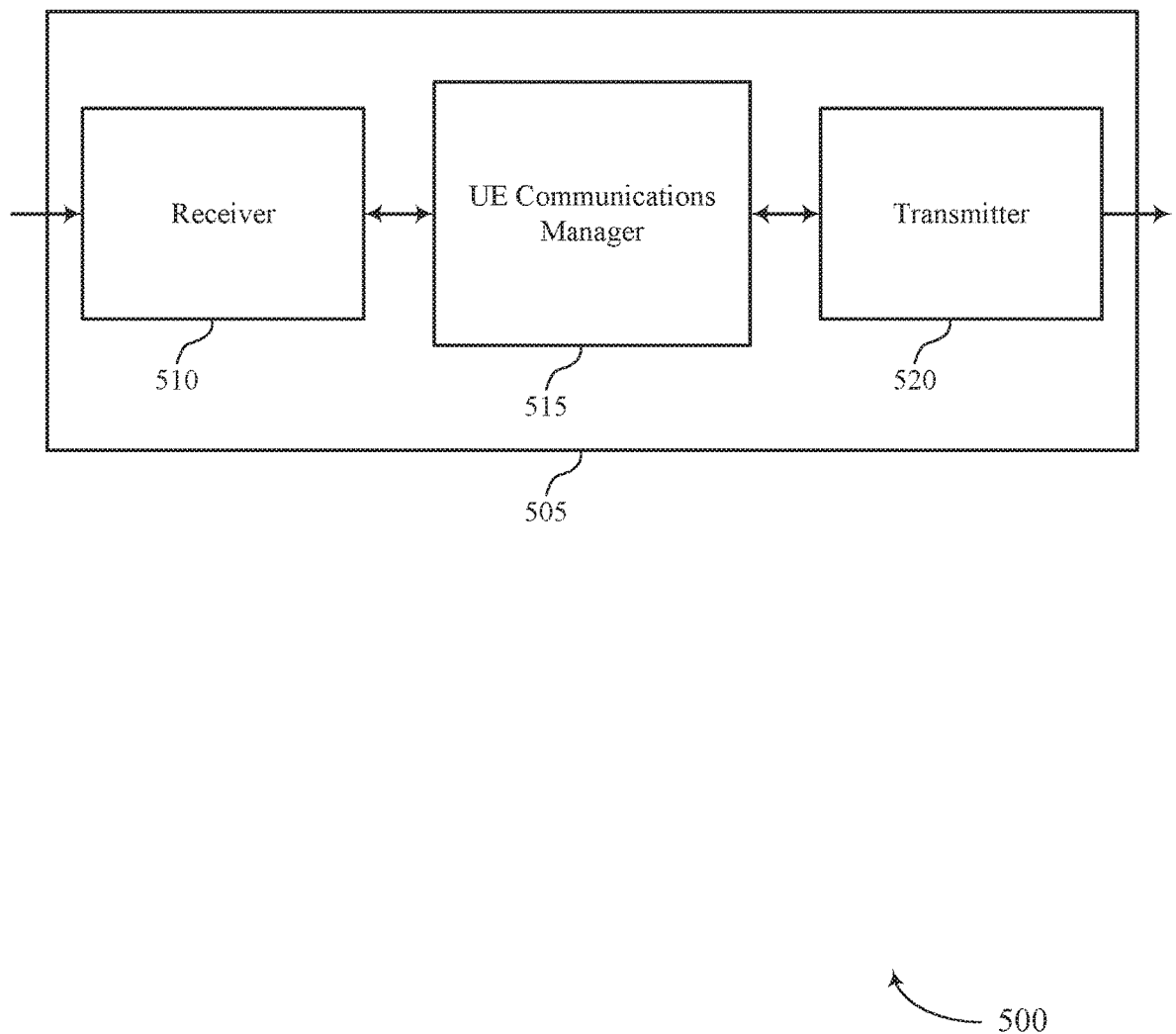
FIGS. 5 through 7 show block diagrams of a device that supports determining beam failure based on a dynamic range of transmission power ratios in accordance with aspects of the present disclosure.

FIG. 5 shows a block diagram 500 of a wireless device 505 that supports determining beam failure based on a dynamic range of transmission power ratios in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to determining beam failure based on a dynamic range of transmission power ratios, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a dynamic range of a transmission power ratio between a first reference signal and a second reference signal of a downlink control channel received from a base station 105; determine a beam failure status based on the dynamic range of the transmission power ratio; and communicate with the base station 105 in accordance with the beam failure status.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
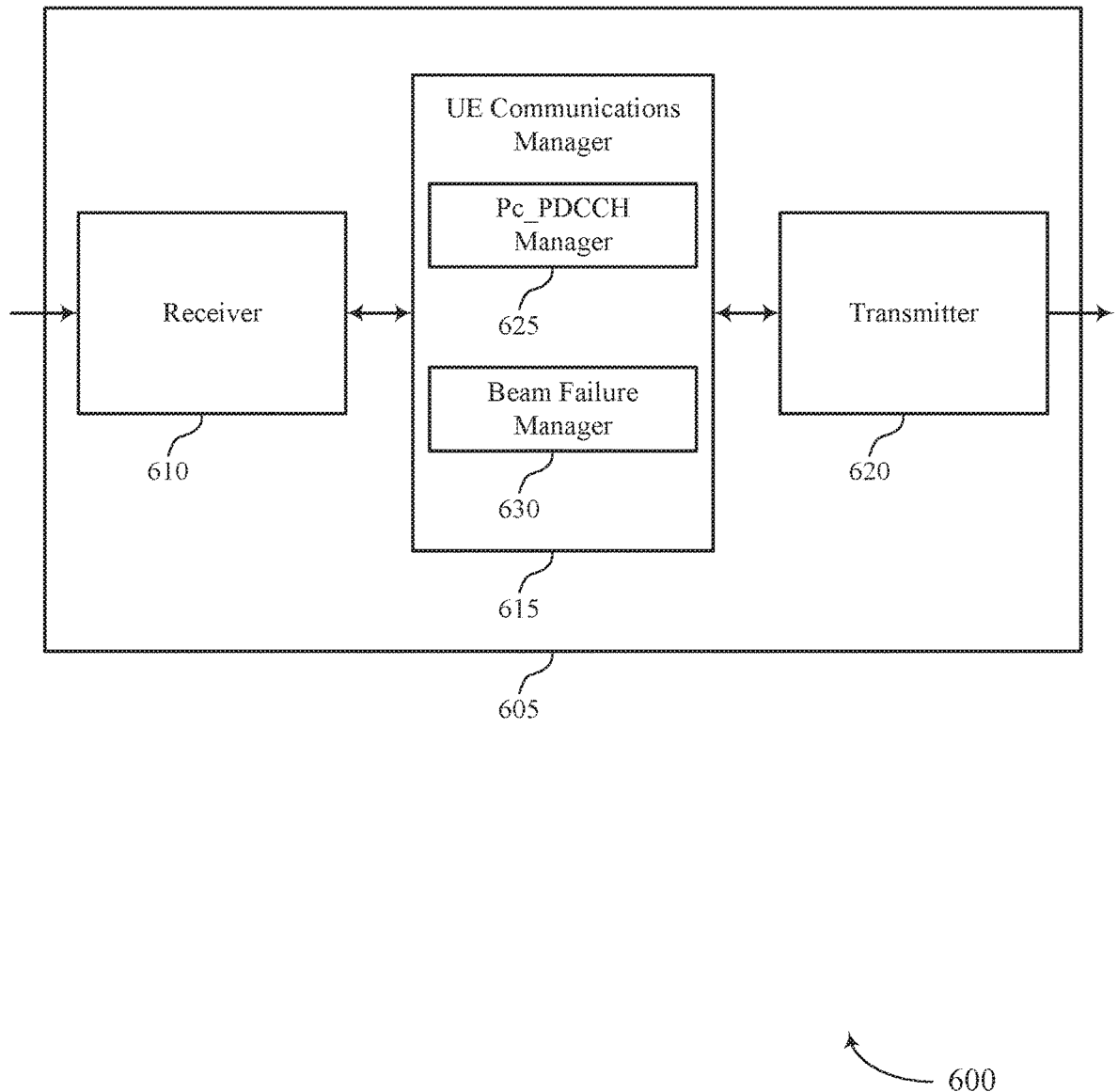

FIG. 6 shows a block diagram 600 of a wireless device 605 that supports determining beam failure based on a dynamic range of transmission power ratios in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to determining beam failure based on a dynamic range of transmission power ratios, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include $P_c$_PDCCH manager 625 (e.g., a transmission power ratio manager or $P_c$_PDCCH_DMRS manager) and beam failure manager 630.

$P_c$_PDCCH manager 625 may identify a dynamic range of a transmission power ratio between a first reference signal and a second reference signal of a downlink control channel received from a base station 105 and determine an upper hypothetical PDCCH BLER and a lower hypothetical PDCCH BLER. In some cases, the first reference signal is a CSI-RS and the second reference signal is a DMRS of a PDCCH. $P_c$_PDCCH manager 625 may determine the beam failure status based on the upper hypothetical PDCCH BLER, the lower hypothetical PDCCH BLER, or both. $P_c$_PDCCH manager 625 may determine the dynamic range of the transmission power ratio based on a maximum positive offset, a maximum negative offset, and an average transmission power ratio (based on the power ratio between the CSI-RS and the PDSCH). In some cases, identifying the dynamic range of the transmission power ratio includes receiving an indication of the dynamic range of the transmission power ratio from the base station 105. In some cases, the indication includes a maximum value associated with the dynamic range of the transmission power ratio and a minimum value associated with the dynamic range of the transmission power ratio. In some cases, the indication includes a maximum positive offset associated with the dynamic range of the transmission power ratio and a maximum negative offset associated with the dynamic range of the transmission power ratio. In some cases, the indication includes an offset value that represents both a maximum positive offset associated with the dynamic range of the transmission power ratio and a maximum negative offset associated with the dynamic range of the transmission power ratio. In some cases, the indication is received via at least one of RRC, a MAC CE, or DCI. In some cases, identifying the dynamic range of the transmission power ratio further includes identifying an offset associated with the dynamic range based on the configuration of the CSI-RS. In some cases, identifying the dynamic range of the transmission power ratio further includes identifying a maximum positive offset and a maximum negative offset associated with the dynamic range based on the configuration of the CSI-RS. In some cases, identifying the dynamic range of the transmission power ratio further includes identifying a maximum CSI-RS to DMRS power ratio and a minimum CSI-RS to DMRS power ratio based on the configuration of the CSI-RS. In some cases, identifying the dynamic range of the transmission power ratio includes receiving an indication of a power ratio between the CSI-RS and a PDSCH received from the base station 105. In some cases, the dynamic range of the transmission power ratio is identified per CSI-RS resource, per CSI-RS resource set, or per CSI-RS resource setting. In some cases, identifying the dynamic range of the transmission power ratio further includes identifying a maximum value associated with the dynamic range of the transmission power ratio and a minimum value associated with the dynamic range of the transmission power ratio based on the configuration of the CSI-RS.

Beam failure manager 630 may determine the beam failure status based on the upper hypothetical PDCCH BLER, the lower hypothetical PDCCH BLER, the CSI-RS measurement, or some combination thereof. Beam failure manager 630 may determine a beam failure status based on the dynamic range of the transmission power ratio and, in some cases, determine a beam failure has occurred based on the determined beam failure status. Beam failure manager 630 may communicate with the base station 105 in accordance with the beam failure status.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
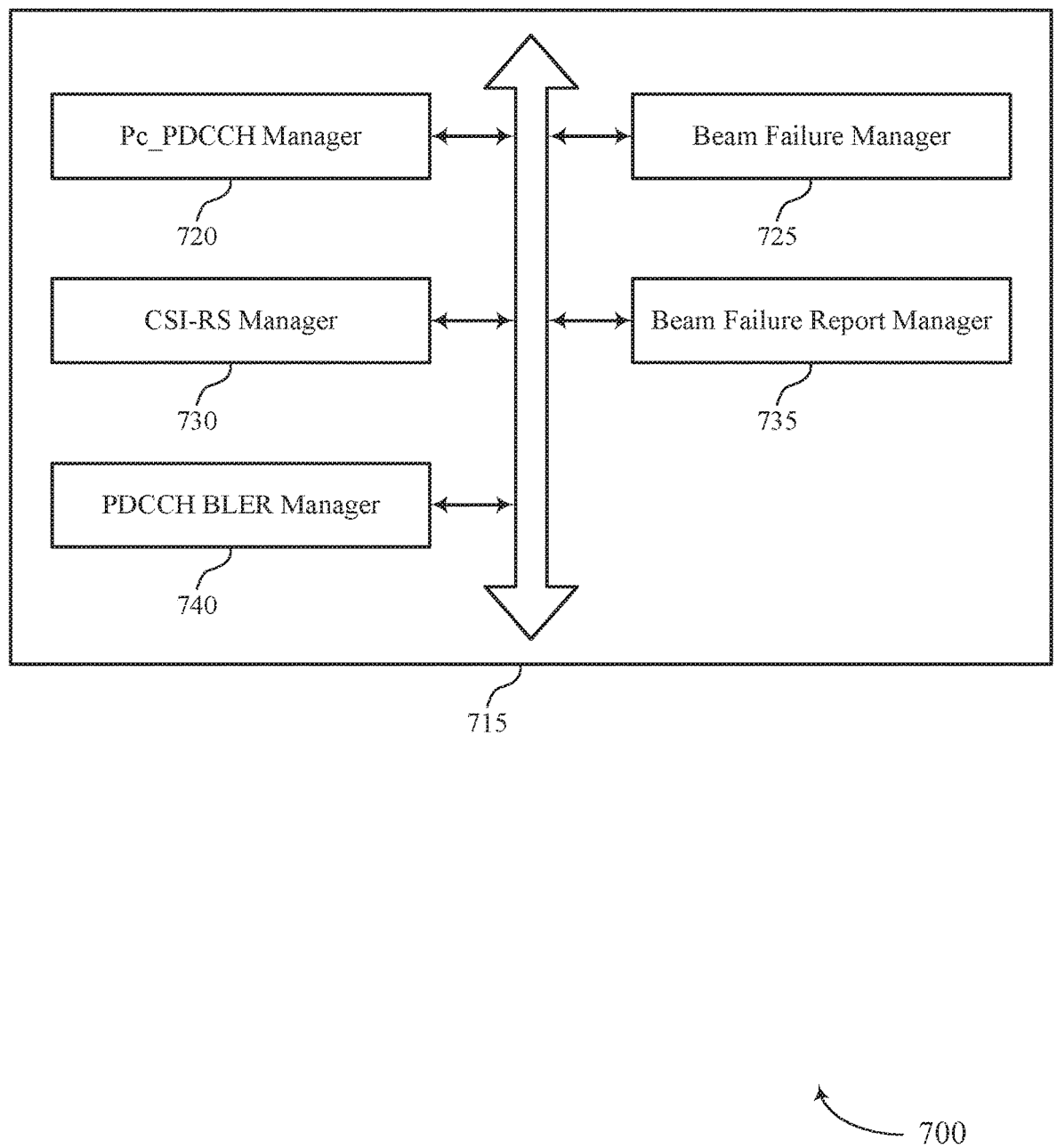

FIG. 7 shows a block diagram 700 of a UE communications manager 715 that supports determining beam failure based on a dynamic range of transmission power ratios in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include $P_c$_PDCCH manager 720 (e.g., a transmission power ratio manager or $P_c$_PDCCH_DMRS manager), beam failure manager 725, CSI-RS manager 730, beam failure report manager 735, and PDCCH BLER manager 740. Each of these modules may communicate, directly or indirectly, with one another (e.g., via one or more buses).

$P_c$_PDCCH manager 720 may identify a dynamic range of a transmission power ratio between a first reference signal and a second reference signal of a downlink control channel received from a base station 105 and determine an upper hypothetical PDCCH BLER and a lower hypothetical PDCCH BLER. In some cases, the first reference signal is a CSI-RS and the second reference signal is a DMRS of a PDCCH. $P_c$_PDCCH manager 720 may determine the beam failure status based on the upper hypothetical PDCCH BLER, the lower hypothetical PDCCH BLER, or both. $P_c$_PDCCH manager 720 may determine the dynamic range of the transmission power ratio based on a maximum positive offset, a maximum negative offset, and an average transmission power ratio (based on the power ratio between the CSI-RS and the PDSCH). In some cases, identifying the dynamic range of the transmission power ratio includes receiving an indication of the dynamic range of the transmission power ratio from the base station 105. In some cases, the indication includes a maximum value associated with the dynamic range of the transmission power ratio and a minimum value associated with the dynamic range of the transmission power ratio. In some cases, the indication includes a maximum positive offset associated with the dynamic range of the transmission power ratio and a maximum negative offset associated with the dynamic range of the transmission power ratio. In some cases, the indication includes an offset value that represents both a maximum positive offset associated with the dynamic range of the transmission power ratio and a maximum negative offset associated with the dynamic range of the transmission power ratio. In some cases, the indication is received via at least one of RRC, a MAC CE, or DCI. In some cases, identifying the dynamic range of the transmission power ratio further includes identifying an offset associated with the dynamic range based on the configuration of the CSI-RS. In some cases, identifying the dynamic range of the transmission power ratio further includes identifying a maximum positive offset and a maximum negative offset associated with the dynamic range based on the configuration of the CSI-RS. In some cases, identifying the dynamic range of the transmission power ratio further includes identifying a maximum CSI-RS to DMRS power ratio and a minimum CSI-RS to DMRS power ratio based on the configuration of the CSI-RS. In some cases, identifying the dynamic range of the transmission power ratio includes receiving an indication of a power ratio between the CSI-RS and a PDSCH received from the base station 105. In some cases, the dynamic range of the transmission power ratio is identified per CSI-RS resource, per CSI-RS resource set, or per CSI-RS resource setting. In some cases, identifying the dynamic range of the transmission power ratio further includes identifying a maximum value associated with the dynamic range of the transmission power ratio and a minimum value associated with the dynamic range of the transmission power ratio based on the configuration of the CSI-RS.

Beam failure manager 725 may determine the beam failure status based on the upper hypothetical PDCCH BLER, the lower hypothetical PDCCH BLER, the CSI-RS measurement, or some combination thereof. Beam failure manager 725 may determine a beam failure status based on the dynamic range of the transmission power ratio and, in some cases, determine a beam failure has occurred based on the determined beam failure status. Beam failure manager 725 may and communicate with the base station 105 in accordance with the beam failure status.

CSI-RS manager 730 may determine the dynamic range of the transmission power ratio based on the indication of the configuration of the CSI-RS and perform a CSI-RS measurement. In some cases, identifying the dynamic range of the transmission power ratio includes: receiving an indication of a configuration of the CSI-RS. In some cases, the configuration includes QCL information, a measurement quantity (e.g., a link configuration) related to the CSI-RS, a CSI report setting associated with the CSI-RS, etc. In some cases, the indication of the configuration of the CSI-RS is received via RRC signaling.

Beam failure report manager 735 may transmit a beam failure status report to the base station 105.

PDCCH BLER manager 740 may determine an upper hypothetical PDCCH BLER and a lower hypothetical PDCCH BLER based on the dynamic range.

Figure 8:
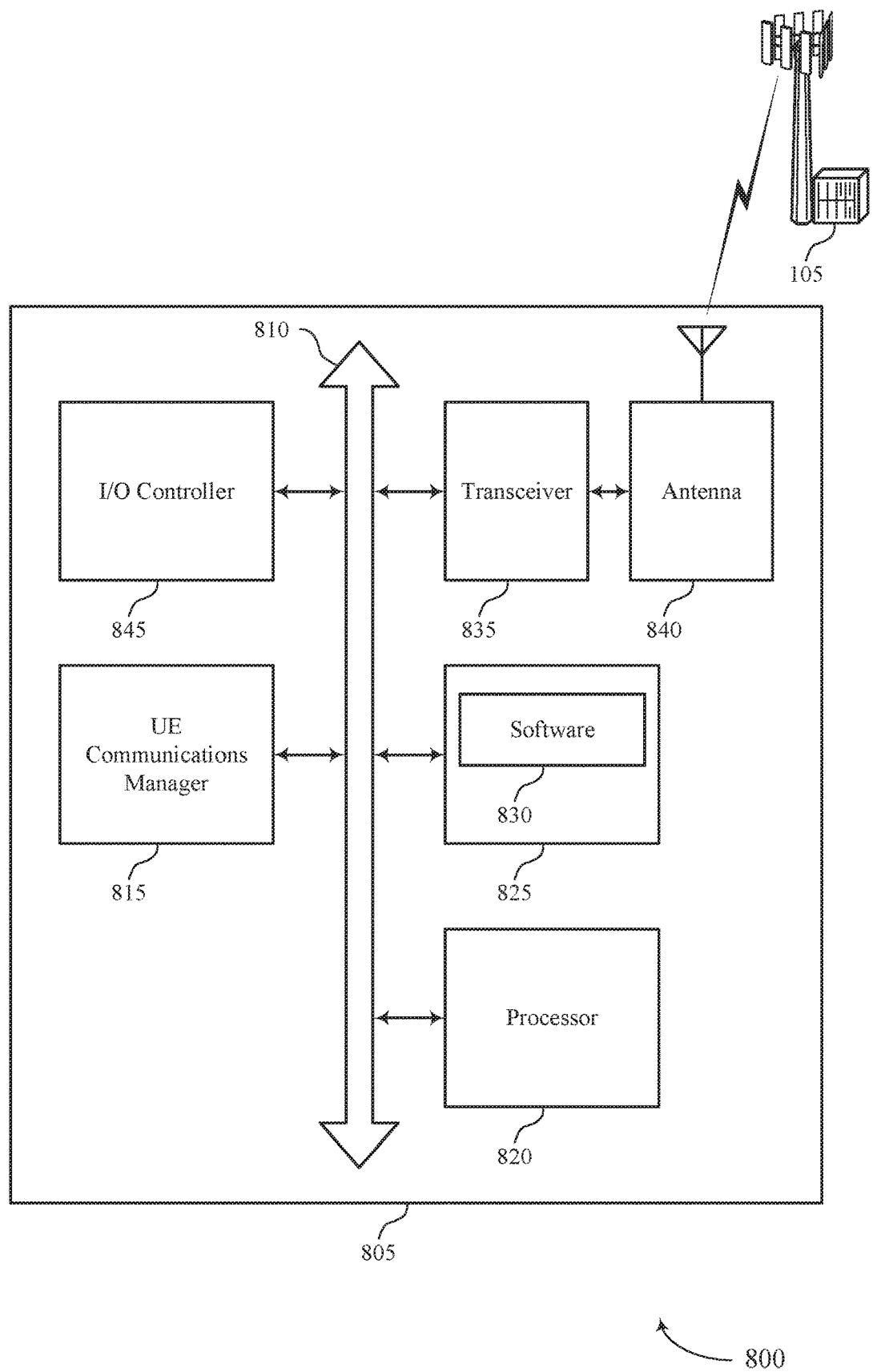
FIG. 8 illustrates a block diagram of a system including a UE that supports determining beam failure based on a dynamic range of transmission power ratios in accordance with aspects of the present disclosure.

FIG. 8 shows a diagram of a system 800 including a device 805 that supports determining beam failure based on a dynamic range of transmission power ratios in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting determining beam failure based on a dynamic range of transmission power ratios).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support determining beam failure based on a dynamic range of transmission power ratios. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
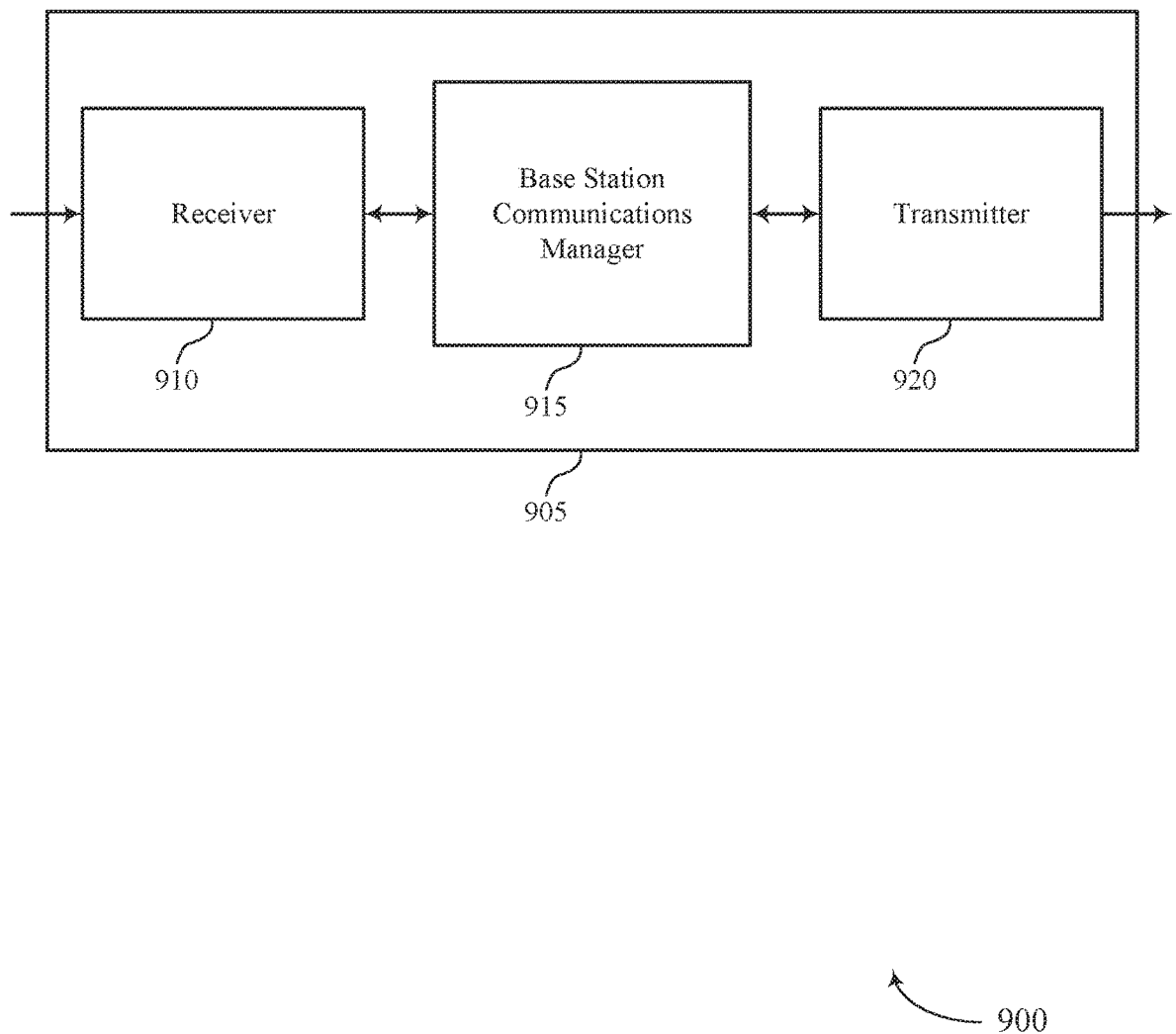
FIGS. 9 through 11 show block diagrams of a device that supports determining beam failure based on a dynamic range of transmission power ratios in accordance with aspects of the present disclosure.

FIG. 9 shows a block diagram 900 of a wireless device 905 that supports determining beam failure based on a dynamic range of transmission power ratios in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to determining beam failure based on a dynamic range of transmission power ratios, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify a dynamic range of a transmission power ratio between a first reference signal and a second reference signal of a downlink control channel to a UE 115. Base station communications manager 915 may further transmit a signal to the UE 115 that facilitates identification of the dynamic range of the transmission power ratio by the UE 115. Base station communications manager 915 may further receive a beam failure status report based on the dynamic range of the transmission power ratio and communicate with the UE 115 in accordance with the beam failure status report.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
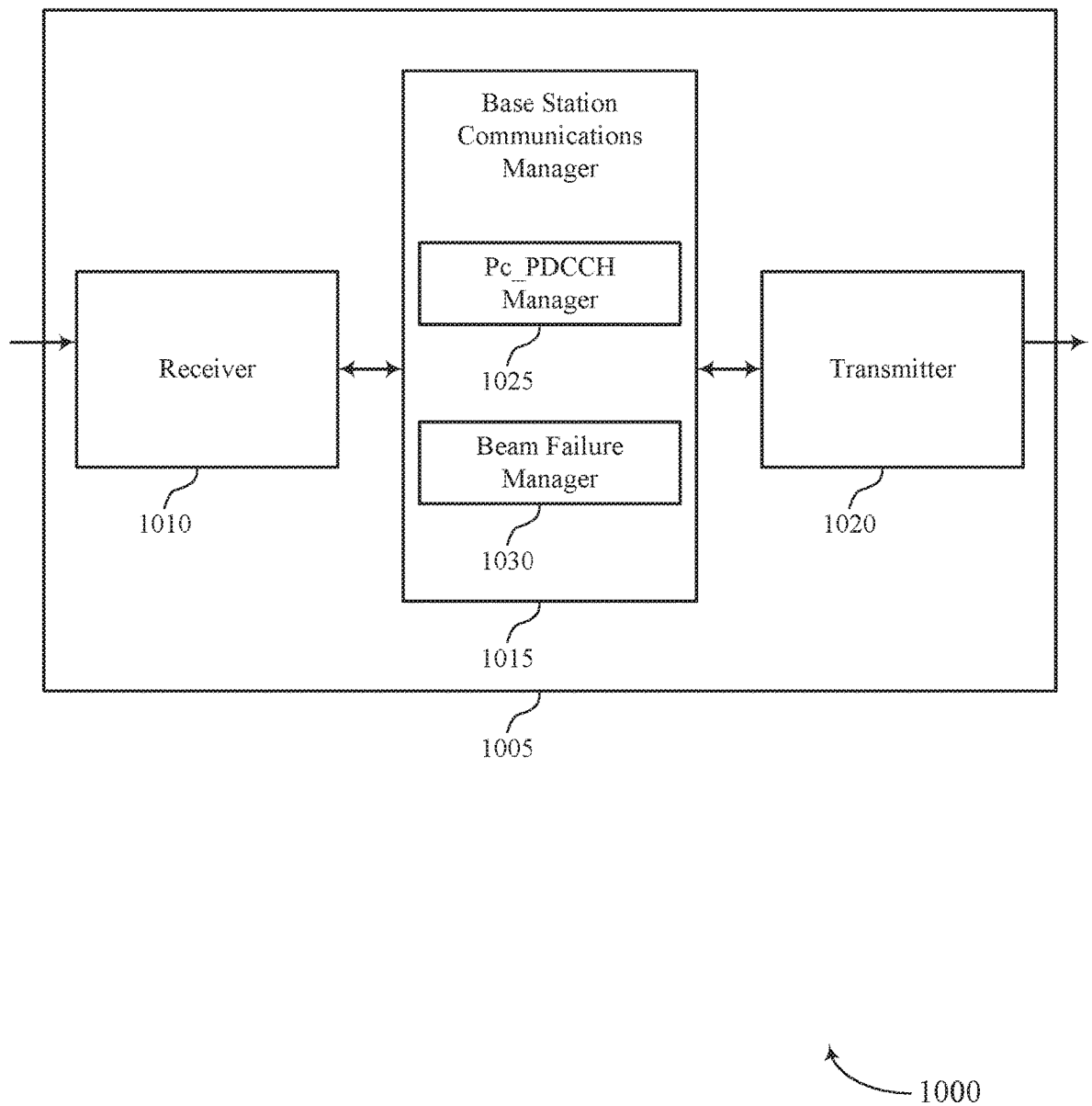

FIG. 10 shows a block diagram 1000 of a wireless device 1005 that supports determining beam failure based on a dynamic range of transmission power ratios in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to determining beam failure based on a dynamic range of transmission power ratios, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include $P_c$_PDCCH manager 1025 (e.g., a transmission power ratio manager or $P_c$_PDCCH_DMRS manager) and beam failure manager 1030.

$P_c$_PDCCH manager 1025 may identify a dynamic range of a transmission power ratio between a first reference signal and a second reference signal of a downlink control channel to a UE 115. $P_c$_PDCCH manager 1025 may further transmit a signal to the UE 115 that facilitates identification of the dynamic range of the transmission power ratio by the UE 115. In some cases, the first reference signal is a CSI-RS and the second reference signal is a DMRS of a PDCCH. In some cases, the signal includes an indication of the dynamic range of the transmission power ratio. In some cases, the indication includes a maximum value associated with the dynamic range of the transmission power ratio and a minimum value associated with the dynamic range of the transmission power ratio. In some cases, the indication includes a maximum positive offset associated with the dynamic range of the transmission power ratio and a maximum negative offset associated with the dynamic range of the transmission power ratio. In some cases, the indication includes an offset value that represents both a maximum positive offset associated with the dynamic range of the transmission power ratio and a maximum negative offset associated with the dynamic range of the transmission power ratio. In some cases, the dynamic range of the transmission power ratio is determined based on a maximum positive offset, a maximum negative offset, and an average transmission power ratio. In some cases, the indication is transmitted via at least one of RRC, a MAC CE, or DCI. In some cases, the dynamic range of the transmission power ratio is identified per CSI-RS resource, per CSI-RS resource set, or per CSI-RS resource setting.

Beam failure manager 1030 may receive a beam failure status report based on the dynamic range of the transmission power ratio and communicate with the UE 115 in accordance with the beam failure status report.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
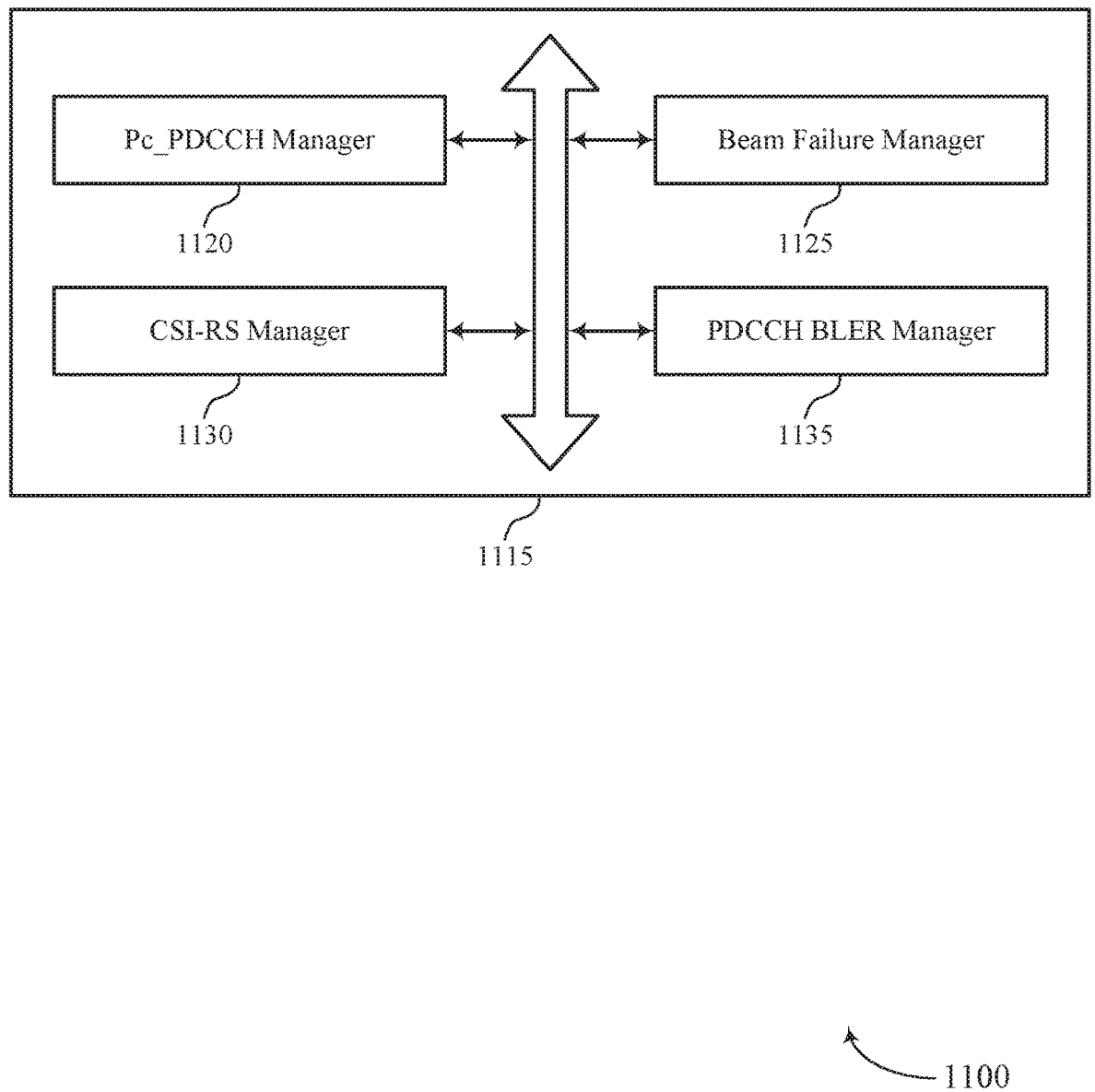

FIG. 11 shows a block diagram 1100 of a base station communications manager 1115 that supports determining beam failure based on a dynamic range of transmission power ratios in accordance with aspects of the present disclosure. The base station communications manager 1115 may be an example of aspects of a base station communications manager 1215 described with reference to FIGS. 9, 10, and 12. The base station communications manager 1115 may include $P_c$_PDCCH manager 1120 (e.g., a transmission power ratio manager or $P_c$_PDCCH_DMRS manager), beam failure manager 1125, CSI-RS manager 1130, and PDCCH BLER manager 1135. Each of these modules may communicate, directly or indirectly, with one another (e.g., via one or more buses).

$P_c$_PDCCH manager 1120 may identify a dynamic range of a transmission power ratio between a first reference signal and a second reference signal of a downlink control channel to a UE 115. $P_c$_PDCCH manager 1120 may further transmit a signal to the UE 115 that facilitates identification of the dynamic range of the transmission power ratio by the UE 115. In some cases, the first reference signal is a CSI-RS and the second reference signal is a DMRS of a PDCCH. In some cases, the signal includes an indication of the dynamic range of the transmission power ratio. In some cases, the indication includes a maximum value associated with the dynamic range of the transmission power ratio and a minimum value associated with the dynamic range of the transmission power ratio. In some cases, the indication includes a maximum positive offset associated with the dynamic range of the transmission power ratio and a maximum negative offset associated with the dynamic range of the transmission power ratio. In some cases, the indication includes an offset value that represents both a maximum positive offset associated with the dynamic range of the transmission power ratio and a maximum negative offset associated with the dynamic range of the transmission power ratio. In some cases, the dynamic range of the transmission power ratio is determined based on a maximum positive offset, a maximum negative offset, and an average transmission power ratio. In some cases, the indication is transmitted via at least one of RRC, a MAC CE, or DCI. In some cases, the dynamic range of the transmission power ratio is identified per CSI-RS resource, per CSI-RS resource set, or per CSI-RS resource setting.

Beam failure manager 1125 may receive a beam failure status report based on the dynamic range of the transmission power ratio and communicate with the UE 115 in accordance with the beam failure status report.

CSI-RS manager 1130 may transmit an indication of a configuration of the CSI-RS, where the configuration indicates the dynamic range of the transmission power ratio. CSI-RS manager 1130 may transmit an indication of a power ratio between the CSI-RS and a PDSCH received from the base station 105, where the dynamic range of the transmission power ratio is based on the power ratio between the CSI-RS and the PDSCH. In some cases, the indication of the configuration indicates at least one of an offset associated with the dynamic range, a maximum positive offset associated with the dynamic range, a maximum negative offset associated with the dynamic range, a maximum CSI-RS to DMRS power ratio, and a minimum CSI-RS to DMRS power ratio. In some cases, the configuration may include QCL information, a measurement quantity (e.g., a link configuration) related to the CSI-RS, a CSI report setting associated with the CSI-RS, etc. In some cases, the indication of the configuration of the CSI-RS is received via RRC signaling.

PDCCH BLER manager 1135 may identify that the beam failure status report is based on an upper hypothetical PDCCH BLER, a lower hypothetical PDCCH BLER, or both, where the upper hypothetical PDCCH BLER and the lower hypothetical PDCCH BLER are derived from the dynamic range of the transmission power ratio. PDCCH BLER manager 1135 may further determine a beam failure has occurred based on the received beam status failure report.

Figure 12:
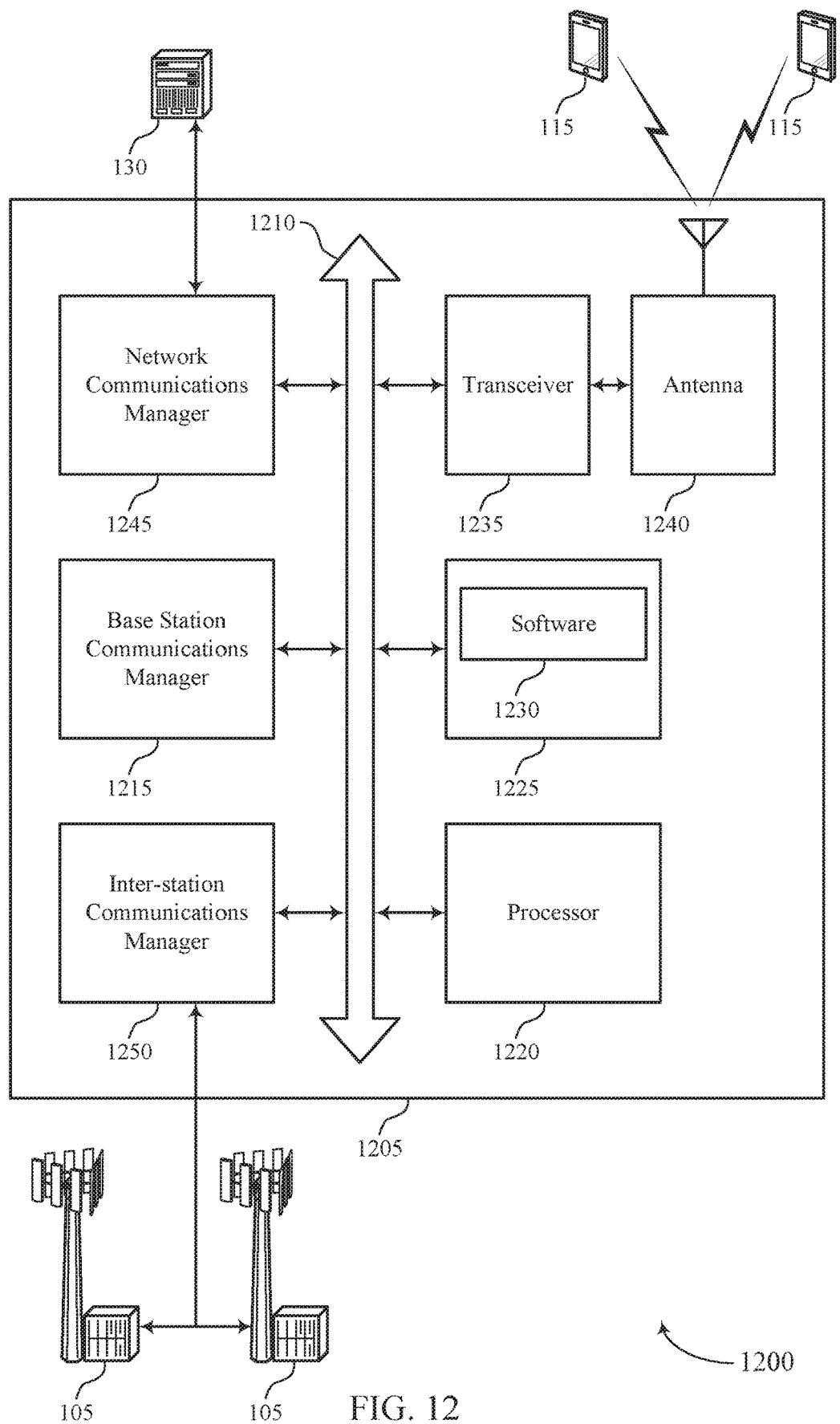
FIG. 12 illustrates a block diagram of a system including a base station that supports determining beam failure based on a dynamic range of transmission power ratios in accordance with aspects of the present disclosure.

FIG. 12 shows a diagram of a system 1200 including a device 1205 that supports determining beam failure based on a dynamic range of transmission power ratios in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting determining beam failure based on a dynamic range of transmission power ratios).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support determining beam failure based on a dynamic range of transmission power ratios. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105 and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within a Long Term Evolution (LTE)/LTE-A wireless communication network technology to provide communication between base stations 105.

Figure 13:
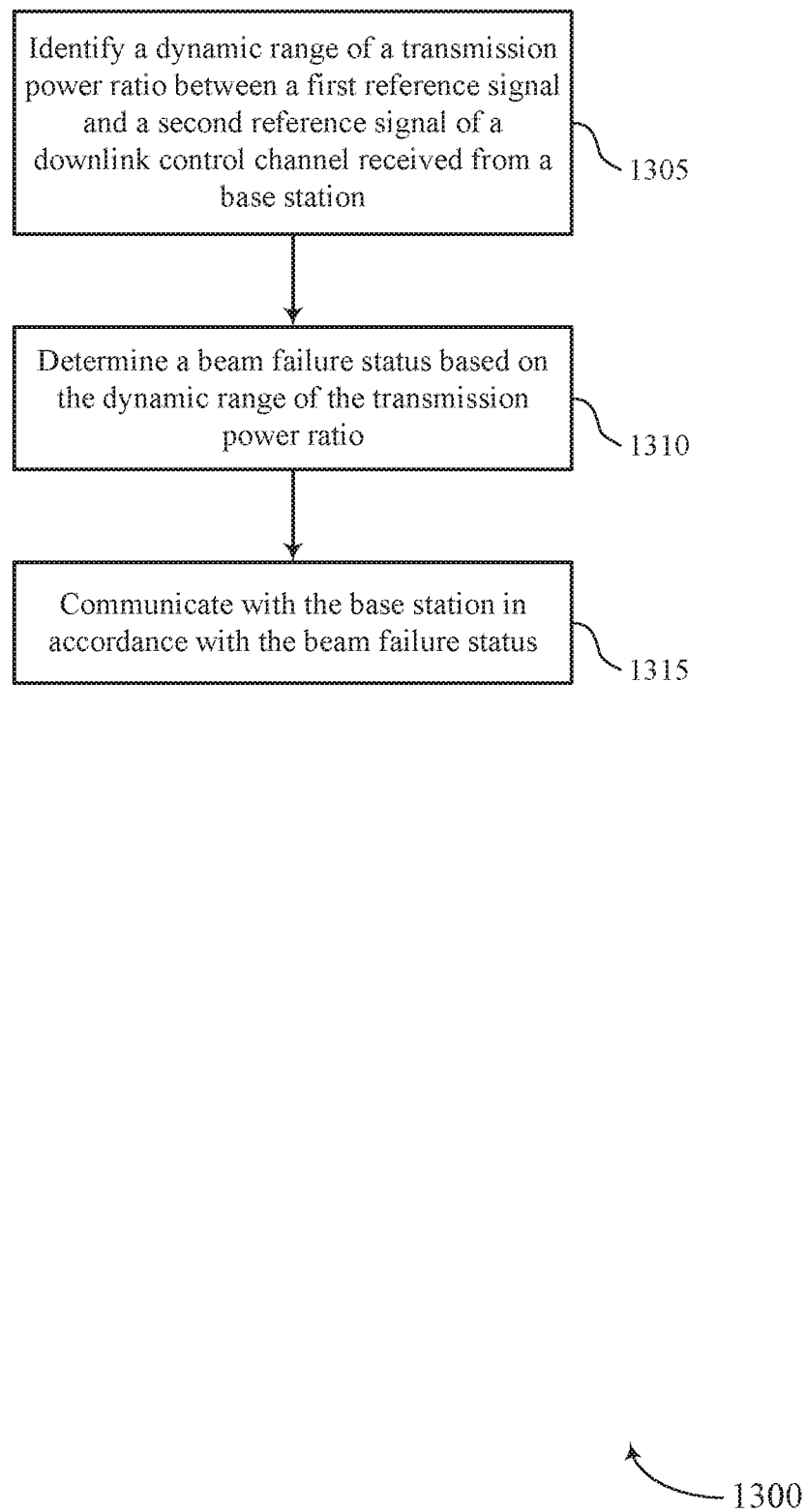
FIGS. 13 through 16 illustrate methods for determining beam failure based on a dynamic range of transmission power ratios in accordance with aspects of the present disclosure.

FIG. 13 shows a flowchart illustrating a method 1300 for determining beam failure based on a dynamic range of transmission power ratios in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may identify a dynamic range of a transmission power ratio between a first reference signal and a second reference signal of a downlink control channel received from a base station 105. The operations of 1305 may be performed according to the methods described herein. In certain examples, aspects of the operations of 1305 may be performed by a $P_c$_PDCCH manager as described with reference to FIGS. 5 through 8.

At 1310 the UE 115 may determine a beam failure status based at least in part on the dynamic range of the transmission power ratio. The operations of 1310 may be performed according to the methods described herein. In certain examples, aspects of the operations of 1310 may be performed by a beam failure manager as described with reference to FIGS. 5 through 8.

At 1315 the UE 115 may communicate with the base station 105 in accordance with the beam failure status. The operations of 1315 may be performed according to the methods described herein. In certain examples, aspects of the operations of 1315 may be performed by a beam failure manager as described with reference to FIGS. 5 through 8.

Figure 14:
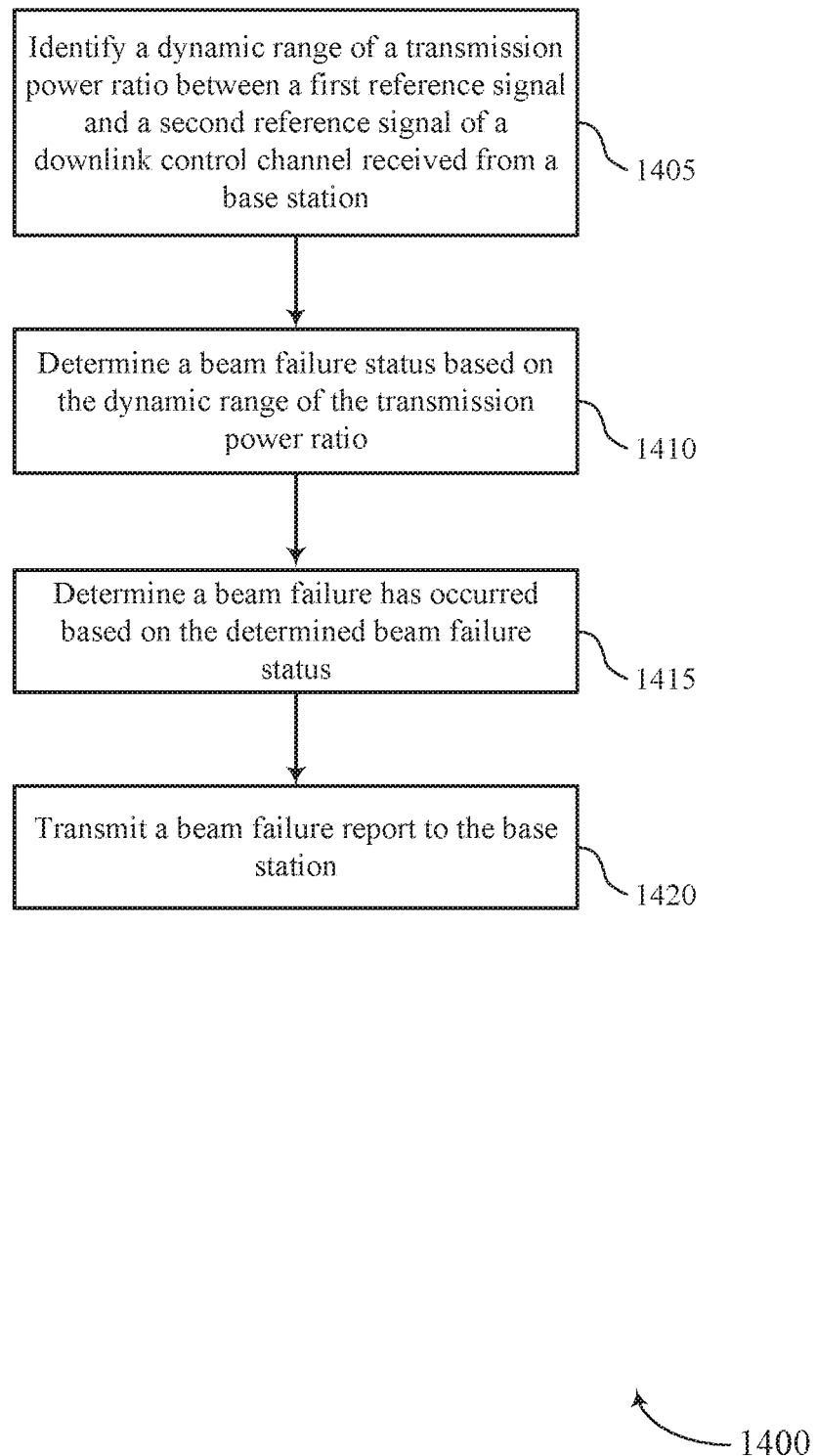

FIG. 14 shows a flowchart illustrating a method 1400 for determining beam failure based on a dynamic range of transmission power ratios in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify a dynamic range of a transmission power ratio between a first reference signal and a second reference signal of a downlink control channel received from a base station 105. In some cases, the first reference signal is a CSI-RS and the second reference signal is a DMRS of a PDCCH. The operations of 1405 may be performed according to the methods described herein. In certain examples, aspects of the operations of 1405 may be performed by a $P_c\_PDCCH$ manager as described with reference to FIGS. 5 through 8.

At 1410 the UE 115 may determine a beam failure status based at least in part on the dynamic range of the transmission power ratio. The operations of 1410 may be performed according to the methods described herein. In certain examples, aspects of the operations of 1410 may be performed by a beam failure manager as described with reference to FIGS. 5 through 8.

At 1415 the UE 115 may determine a beam failure has occurred based at least in part on the determined beam failure status. The operations of 1415 may be performed according to the methods described herein. In certain examples, aspects of the operations of 1415 may be performed by a beam failure manager as described with reference to FIGS. 5 through 8.

At 1420 the UE 115 may transmit a beam failure report to the base station 105. The operations of 1420 may be performed according to the methods described herein. In certain examples, aspects of the operations of 1420 may be performed by a beam failure report manager as described with reference to FIGS. 5 through 8.

Figure 15:
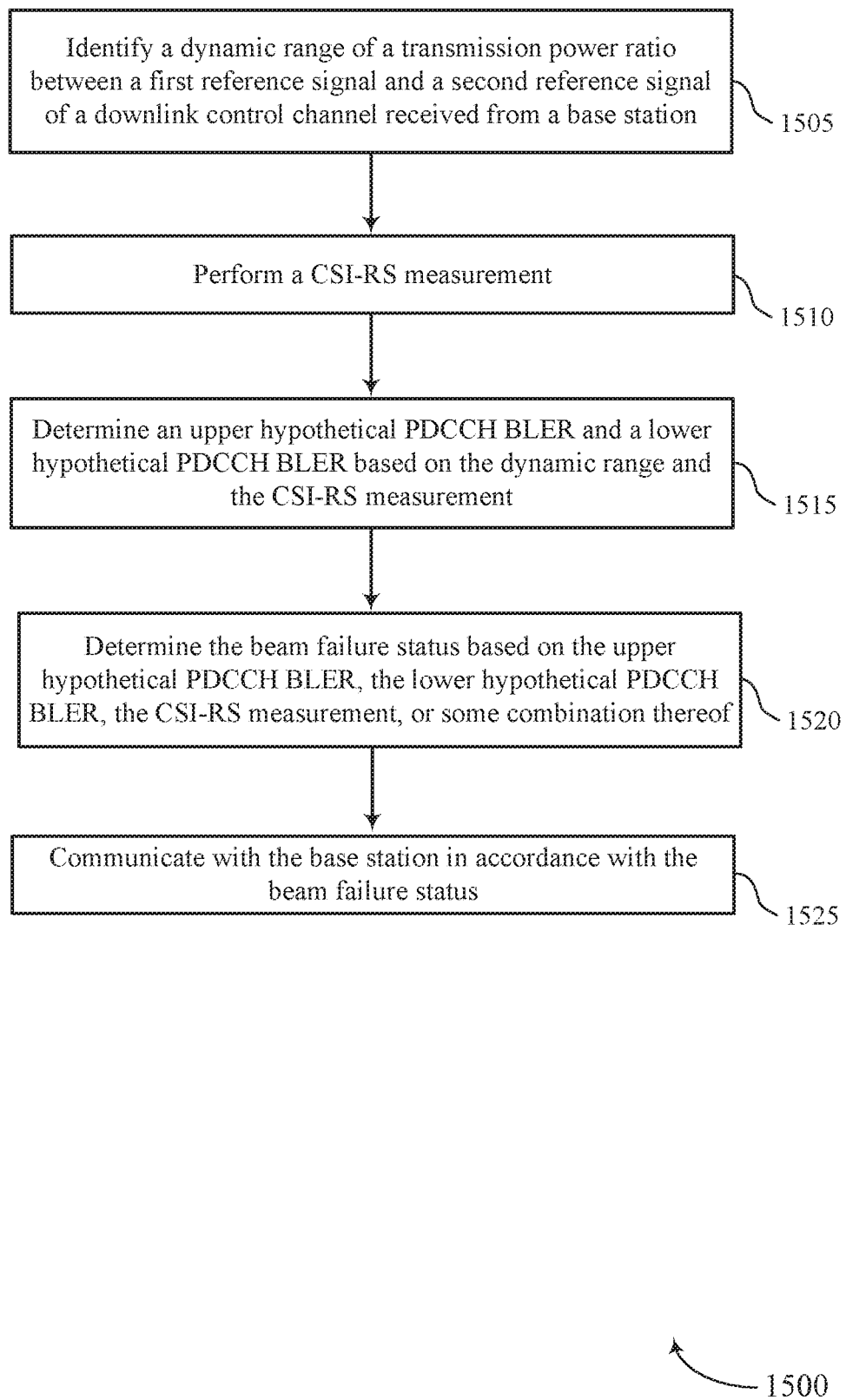

FIG. 15 shows a flowchart illustrating a method 1500 for determining beam failure based on a dynamic range of transmission power ratios in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify a dynamic range of a transmission power ratio between a first reference signal and a second reference signal of a downlink control channel received from a base station 105. The operations of 1505 may be performed according to the methods described herein. In certain examples, aspects of the operations of 1505 may be performed by a $P_c\_PDCCH$ manager as described with reference to FIGS. 5 through 8.

At 1510 the UE 115 may perform a CSI-RS measurement. The operations of 1510 may be performed according to the methods described herein. In certain examples, aspects of the operations of 1510 may be performed by a CSI-RS manager as described with reference to FIGS. 5 through 8.

At 1515 the UE 115 may determine an upper hypothetical PDCCH BLER and a lower hypothetical PDCCH BLER based at least in part on the dynamic range and the CSI-RS measurement. The operations of 1515 may be performed according to the methods described herein. In certain examples, aspects of the operations of 1515 may be performed by a PDCCH BLER manager as described with reference to FIGS. 5 through 8.

At 1520 the UE 115 may determine the beam failure status based at least in part on the upper hypothetical PDCCH BLER, the lower hypothetical PDCCH BLER, or both. The operations of 1520 may be performed according to the methods described herein. In certain examples, aspects of the operations of 1520 may be performed by a $P_c\_PDCCH$ manager as described with reference to FIGS. 5 through 8.

At 1525 the UE 115 may communicate with the base station 105 in accordance with the beam failure status. The operations of 1525 may be performed according to the methods described herein. In certain examples, aspects of the operations of 1525 may be performed by a beam failure manager as described with reference to FIGS. 5 through 8.

Figure 16:
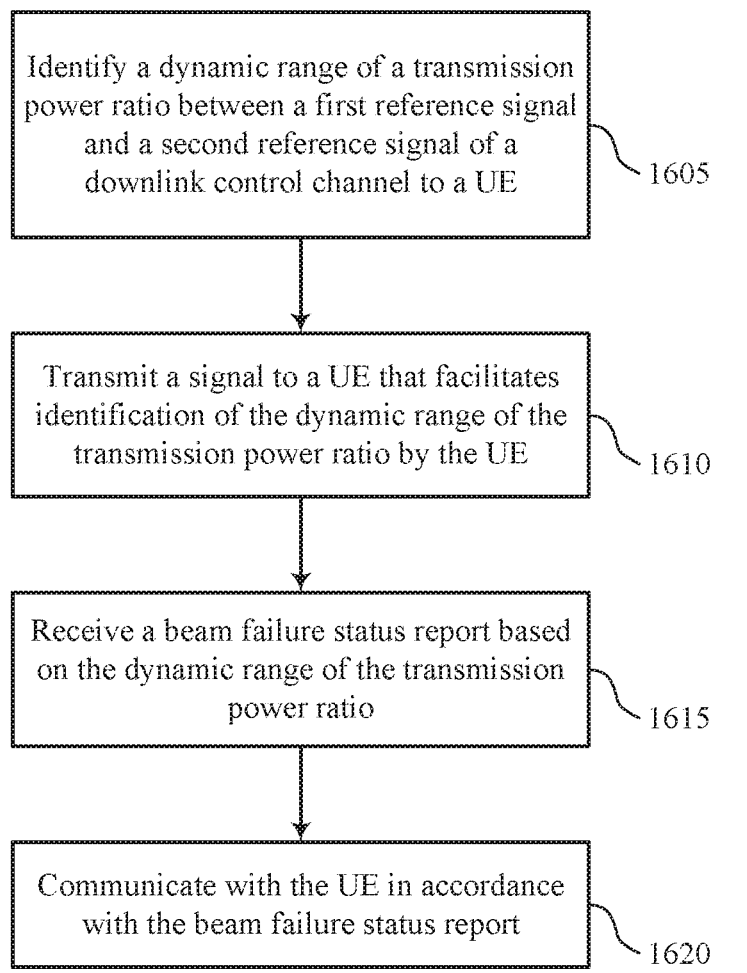

FIG. 16 shows a flowchart illustrating a method 1600 for determining beam failure based on a dynamic range of transmission power ratios in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify a dynamic range of a transmission power ratio between a first reference signal and a second reference signal of a downlink control channel to a UE 115. The operations of 1605 may be performed according to the methods described herein. In certain examples, aspects of the operations of 1605 may be performed by a $P_c\_PDCCH$ manager as described with reference to FIGS. 9 through 12.

At 1610 the base station 105 may transmit a signal to the UE 115 that facilitates identification of the dynamic range of the transmission power ratio by the UE 115. The operations of 1610 may be performed according to the methods described herein. In certain examples, aspects of the operations of 1610 may be performed by a $P_c\_PDCCH$ manager as described with reference to FIGS. 9 through 12.

At 1615 the base station 105 may receive a beam failure status report based at least in part on the dynamic range of the transmission power ratio. The operations of 1615 may be performed according to the methods described herein. In certain examples, aspects of the operations of 1615 may be performed by a beam failure manager as described with reference to FIGS. 9 through 12.

At 1620 the base station 105 may communicate with the UE 115 in accordance with the beam failure status report.

The operations of 1620 may be performed according to the methods described herein. In certain examples, aspects of the operations of 1620 may be performed by a beam failure manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a network device, an indication of a dynamic range of a transmission power ratio, wherein the transmission power ratio is a ratio between a first reference signal and a second reference signal of a downlink control channel received from the network device, wherein the dynamic range is bounded by a maximum value of the transmission power ratio and a minimum value of the transmission power ratio;
   determining a beam failure status based at least in part on the dynamic range of the transmission power ratio; and
   communicating with the network device in accordance with the beam failure status.

2. The method of claim 1, wherein the first reference signal is a channel state information reference signal (CSI-RS) and the second reference signal is a demodulation reference signal (DMRS) of a physical downlink control channel (PDCCH).

3. The method of claim 1, wherein the indication includes a maximum positive offset associated with the dynamic range of the transmission power ratio and a maximum negative offset associated with the dynamic range of the transmission power ratio.

4. The method of claim 1, wherein the indication includes an offset value that represents both a maximum positive offset associated with the dynamic range of the transmission power ratio and a maximum negative offset associated with the dynamic range of the transmission power ratio.

5. The method of claim 1, further comprising:
   determining the dynamic range of the transmission power ratio based at least in part on a maximum positive offset, a maximum negative offset, and an average transmission power ratio.

6. The method of claim 1, wherein the indication is received via at least one of radio resource control (RRC), a medium access control (MAC) control element (MAC CE), or downlink control information (DCI).

7. The method of claim 2, wherein receiving the indication of the dynamic range of the transmission power ratio comprises:
   receiving a message indicative of a configuration of the CSI-RS; and
   determining the dynamic range of the transmission power ratio based at least in part on the configuration of the CSI-RS.

8. The method of claim 7, wherein the configuration includes at least one of quasi-co-location (QCL) information, a measurement quantity related to the CSI-RS, and a CSI report setting associated with the CSI-RS.

9. The method of claim 7, wherein the indication of the configuration of the CSI-RS is received via radio resource control (RRC) signaling.

10. The method of claim 7, further comprising:
    identifying a maximum value associated with the dynamic range of the transmission power ratio and a minimum value associated with the dynamic range of the transmission power ratio based at least in part on the configuration of the CSI-RS.

11. The method of claim 7, further comprising:
    identifying an offset associated with the dynamic range based at least in part on the configuration of the CSI-RS.

12. The method of claim 7, further comprising:
    identifying a maximum positive offset and a maximum negative offset associated with the dynamic range based at least in part on the configuration of the CSI-RS.

13. The method of claim 7, further comprising:
    identifying a maximum CSI-RS to DMRS power ratio and a minimum CSI-RS to DMRS power ratio based at least in part on the configuration of the CSI-RS.

14. The method of claim 2, wherein receiving the indication of the dynamic range of the transmission power ratio comprises:
    receiving a message indicative of a power ratio between the CSI-RS and a physical downlink shared channel (PDSCH) received from the network device; and determining the dynamic range of the transmission power ratio based at least in part on the power ratio between the CSI-RS and the PDSCH.

15. The method of claim 2, further comprising:
determining a beam failure has occurred based at least in part on the determined beam failure status; and
transmitting a beam failure report to the network device.

16. The method of claim 2, wherein the dynamic range of the transmission power ratio is identified per CSI-RS resource, per CSI-RS resource set, or per CSI-RS resource setting.

17. The method of claim 2, further comprising:
determining an upper hypothetical PDCCH block error rate (BLER) and a lower hypothetical PDCCH BLER based at least in part on the dynamic range; and
determining the beam failure status based at least in part on the upper hypothetical PDCCH BLER, the lower hypothetical PDCCH BLER, or both.

18. The method of claim 17, further comprising:
performing a CSI-RS measurement; and
determining the beam failure status based at least in part on the upper hypothetical PDCCH BLER, the lower hypothetical PDCCH BLER, the CSI-RS measurement, or some combination thereof.

19. A method for wireless communication, comprising:
identifying a dynamic range of a transmission power ratio between a first reference signal and a second reference signal of a downlink control channel to a user equipment (UE), wherein the dynamic range is bounded by a maximum value of the transmission power ratio and a minimum value of the transmission power ratio;
transmitting, to the UE, a signal that facilitates identification of the dynamic range of the transmission power ratio by the UE, wherein the signal includes an indication of the dynamic range of the transmission power ratio;
receiving a beam failure status report based at least in part on the dynamic range of the transmission power ratio; and
communicating with the UE in accordance with the beam failure status report.

20. The method of claim 19, wherein the first reference signal is a channel state information reference signal (CSI-RS) and the second reference signal is a demodulation reference signal (DMRS) of a physical downlink control channel (PDCCH).

21. The method of claim 19, wherein the indication includes a maximum positive offset associated with the dynamic range of the transmission power ratio and a maximum negative offset associated with the dynamic range of the transmission power ratio.

22. The method of claim 19, wherein the indication includes an offset value that represents both a maximum positive offset associated with the dynamic range of the transmission power ratio and a maximum negative offset associated with the dynamic range of the transmission power ratio.

23. The method of claim 19, wherein the dynamic range of the transmission power ratio is determined based at least in part on a maximum positive offset, a maximum negative offset, and an average transmission power ratio.

24. The method of claim 19, wherein the indication is transmitted via at least one of radio resource control (RRC), a medium access control (MAC) control element (MAC CE), or downlink control information (DCI).

25. The method of claim 20, further comprising:
transmitting an indication of a configuration of the CSI-RS, wherein the configuration indicates the dynamic range of the transmission power ratio.

26. The method of claim 25, wherein the configuration includes at least one of quasi-co-location (QCL) information, a measurement quantity related to the CSI-RS, and a CSI report setting associated with the CSI-RS.

27. The method of claim 25, wherein the indication of the configuration of the CSI-RS is received via radio resource control (RRC) signaling.

28. The method of claim 25, wherein the indication of the configuration indicates at least one of an offset associated with the dynamic range, a maximum positive offset associated with the dynamic range, a maximum negative offset associated with the dynamic range, a maximum CSI-RS to DMRS power ratio, and a minimum CSI-RS to DMRS power ratio.

29. The method of claim 20, further comprising:
transmitting an indication of a power ratio between the CSI-RS and a physical downlink shared channel (PDSCH), wherein the dynamic range of the transmission power ratio is based at least in part on the power ratio between the CSI-RS and the PDSCH.

30. The method of claim 20, further comprising:
identifying that the beam failure status report is based on an upper hypothetical PDCCH block error rate (BLER), a lower hypothetical PDCCH BLER, or both, wherein the upper hypothetical PDCCH BLER and the lower hypothetical PDCCH BLER are derived from the dynamic range of the transmission power ratio; and
determining a beam failure has occurred based at least in part on the received beam failure status report.

31. The method of claim 20, wherein the dynamic range of the transmission power ratio is identified per CSI-RS resource, per CSI-RS resource set, or per CSI-RS resource setting.

32. An apparatus for wireless communication, comprising:
means for receiving, from a network device, an indication of a dynamic range of a transmission power ratio, wherein the transmission power ratio is a ratio between a first reference signal and a second reference signal of a downlink control channel received from the network device, wherein the dynamic range is bounded by a maximum value of the transmission power ratio and a minimum value of the transmission power ratio;
means for determining a beam failure status based at least in part on the dynamic range of the transmission power ratio; and
means for communicating with the network device in accordance with the beam failure status.

33. The apparatus of claim 32, wherein the first reference signal is a channel state information reference signal (CSI-RS) and the second reference signal is a demodulation reference signal (DMRS) of a physical downlink control channel (PDCCH).

34. The apparatus of claim 32, wherein the indication includes a maximum positive offset associated with the dynamic range of the transmission power ratio and a maximum negative offset associated with the dynamic range of the transmission power ratio.

35. The apparatus of claim 32, wherein the indication includes an offset value that represents both a maximum positive offset associated with the dynamic range of the transmission power ratio and a maximum negative offset associated with the dynamic range of the transmission power ratio.

36. The apparatus of claim 32, further comprising:
means for determining the dynamic range of the transmission power ratio based at least in part on a maximum positive offset, a maximum negative offset, and an average transmission power ratio.

37. The apparatus of claim 32, wherein the indication is received via at least one of radio resource control (RRC), a medium access control (MAC) control element (MAC CE), or downlink control information (DCI).

38. The apparatus of claim 33, wherein the means for receiving the indication of the dynamic range of the transmission power ratio comprises:
means for receiving a message indicative of a configuration of the CSI-RS; and
means for determining the dynamic range of the transmission power ratio based at least in part on the configuration of the CSI-RS.

39. The apparatus of claim 38, wherein the configuration includes at least one of quasi-co-location (QCL) information, a measurement quantity related to the CSI-RS, and a CSI report setting associated with the CSI-RS.

40. The apparatus of claim 38, wherein the indication of the configuration of the CSI-RS is received via radio resource control (RRC) signaling.

41. The apparatus of claim 38, further comprising:
means for identifying a maximum value associated with the dynamic range of the transmission power ratio and a minimum value associated with the dynamic range of the transmission power ratio based at least in part on the configuration of the CSI-RS.

42. The apparatus of claim 38, further comprising:
means for identifying an offset associated with the dynamic range based at least in part on the configuration of the CSI-RS.

43. The apparatus of claim 38, further comprising:
means for identifying a maximum positive offset and a maximum negative offset associated with the dynamic range based at least in part on the configuration of the CSI-RS.

44. The apparatus of claim 38, further comprising:
means for identifying a maximum CSI-RS to DMRS power ratio and a minimum CSI-RS to DMRS power ratio based at least in part on the configuration of the CSI-RS.

45. The apparatus of claim 33, wherein the means for receiving the indication of the dynamic range of the transmission power ratio comprises:
means for receiving a message indicative of a power ratio between the CSI-RS and a physical downlink shared channel (PDSCH) received from the network device; and
means for determining the dynamic range of the transmission power ratio based at least in part on the power ratio between the CSI-RS and the PDSCH.

46. The apparatus of claim 33, further comprising:
means for determining a beam failure has occurred based at least in part on the determined beam failure status; and
means for transmitting a beam failure report to the network device.

47. The apparatus of claim 33, wherein the dynamic range of the transmission power ratio is identified per CSI-RS resource, per CSI-RS resource set, or per CSI-RS resource setting.

48. The apparatus of claim 33, further comprising:
means for determining an upper hypothetical PDCCH block error rate (BLER) and a lower hypothetical PDCCH BLER based at least in part on the dynamic range; and
means for determining the beam failure status based at least in part on the upper hypothetical PDCCH BLER, the lower hypothetical PDCCH BLER, or both.

49. The apparatus of claim 48, further comprising:
means for performing a CSI-RS measurement; and
means for determining the beam failure status based at least in part on the upper hypothetical PDCCH BLER, the lower hypothetical PDCCH BLER, the CSI-RS measurement, or some combination thereof.

50. An apparatus for wireless communication, comprising:
means for identifying a dynamic range of a transmission power ratio between a first reference signal and a second reference signal of a downlink control channel to a user equipment (UE), wherein the dynamic range is bounded by a maximum value of the transmission power ratio and a minimum value of the transmission power ratio;
means for transmitting, to the UE, a signal that facilitates identification of the dynamic range of the transmission power ratio by the UE, wherein the signal includes an indication of the dynamic range of the transmission power ratio;
means for receiving a beam failure status report based at least in part on the dynamic range of the transmission power ratio; and
means for communicating with the UE in accordance with the beam failure status report.

51. The apparatus of claim 50, wherein the first reference signal is a channel state information reference signal (CSI-RS) and the second reference signal is a demodulation reference signal (DMRS) of a physical downlink control channel (PDCCH).

52. The apparatus of claim 50, wherein the indication includes a maximum positive offset associated with the dynamic range of the transmission power ratio and a maximum negative offset associated with the dynamic range of the transmission power ratio.

53. The apparatus of claim 50, wherein the indication includes an offset value that represents both a maximum positive offset associated with the dynamic range of the transmission power ratio and a maximum negative offset associated with the dynamic range of the transmission power ratio.

54. The apparatus of claim 50, wherein the dynamic range of the transmission power ratio is determined based at least in part on a maximum positive offset, a maximum negative offset, and an average transmission power ratio.

55. The apparatus of claim 50, wherein the indication is transmitted via at least one of radio resource control (RRC), a medium access control (MAC) control element (MAC CE), or downlink control information (DCI).

56. The apparatus of claim 51, further comprising:
means for transmitting an indication of a configuration of the CSI-RS, wherein the configuration indicates the dynamic range of the transmission power ratio.

57. The apparatus of claim 56, wherein the configuration includes at least one of quasi-co-location (QCL) information, a measurement link configuration related to the CSI-RS, and a CSI report setting associated with the CSI-RS.

58. The apparatus of claim 56, wherein the indication of the configuration of the CSI-RS is received via radio resource control (RRC) signaling.

59. The apparatus of claim 56, wherein the indication of the configuration indicates at least one of an offset associated with the dynamic range, a maximum positive offset associated with the dynamic range, a maximum negative offset associated with the dynamic range, a maximum CSI-RS to DMRS power ratio, and a minimum CSI-RS to DMRS power ratio.

60. The apparatus of claim 51, further comprising:
means for transmitting an indication of a power ratio between the CSI-RS and a physical downlink shared channel (PDSCH), wherein the dynamic range of the transmission power ratio is based at least in part on the power ratio between the CSI-RS and the PDSCH.

61. The apparatus of claim 51, further comprising:
means for identifying that the beam failure status report is based on an upper hypothetical PDCCH block error rate (BLER), a lower hypothetical PDCCH BLER, or both, wherein the upper hypothetical PDCCH BLER and the lower hypothetical PDCCH BLER are derived from the dynamic range of the transmission power ratio; and
means for determining a beam failure has occurred based at least in part on the received beam failure status report.

62. The apparatus of claim 51, wherein the dynamic range of the transmission power ratio is identified per CSI-RS resource, per CSI-RS resource set, or per CSI-RS resource setting.

* * * * *